(12) United States Patent
Kobayashi et al.

(10) Patent No.: US 6,218,465 B1
(45) Date of Patent: *Apr. 17, 2001

(54) CROSSLINKED ELASTOMER AND PRODUCING PROCESS THEREOF

(75) Inventors: Minoru Kobayashi, Takatsuki; Minoru Aoki, Ibaraki; Yoshinobu Asako, Tsuchiura; Akihiko Fukada, Nishinomiya; Hayato Ikeda, Nara, all of (JP)

(73) Assignee: Nippon Shokubai Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,702

(22) Filed: Feb. 27, 1998

(30) Foreign Application Priority Data

| Mar. 5, 1997 | (JP) | 9-050787 |
| Mar. 5, 1997 | (JP) | 9-050789 |
| Dec. 17, 1997 | (JP) | 9-347614 |

(51) Int. Cl.⁷ .............. C08J 5/10; C08K 3/00; C08L 33/08
(52) U.S. Cl. .......... 524/847; 524/700; 524/705
(58) Field of Search ............. 524/847, 700, 524/705

(56) References Cited

U.S. PATENT DOCUMENTS

| 4,562,234 | 12/1985 | Besecke et al. | 526/241 |
| 4,904,736 | 2/1990 | Shimizu et al. | 525/279 |
| 5,093,426 | 3/1992 | Sakabe et al. | 525/223 |
| 5,132,052 | 7/1992 | Cobbledick et al. | 252/511 |
| 5,137,981 | * 8/1992 | Yamada et al. | 525/332.3 |

FOREIGN PATENT DOCUMENTS

| 0 603 133 A1 | 6/1994 | (EP) . |
| 56-74110 | 6/1981 | (JP) . |
| 58-196268 | 11/1983 | (JP) . |
| 7-053831 | 2/1995 | (JP) . |
| 8-073535 | 3/1996 | (JP) . |
| 8-283355 | 10/1996 | (JP) . |
| 9-104704 | 4/1997 | (JP) . |
| 9-194513 | 7/1997 | (JP) . |

OTHER PUBLICATIONS

Bowles, "Printing Ink Manual", W. Heffer & Sons Ltd., XP–002069306 (No date).

* cited by examiner

Primary Examiner—James J. Seidleck
Assistant Examiner—U. K. Rajguru
(74) Attorney, Agent, or Firm—Kubovick & Kobovick

(57) ABSTRACT

For example, a blended composition is produced first by letting a monomer composition, mainly composed of alkyl (meth)acrylate and including a compound having a plurality of polymeric groups within a molecule, contain microscopic particles, such as carbon black, having an average primary particle size in a range between 1 nm and 200 nm, and then the blended composition is polymerized. Consequently, it has become possible to produce inexpensive crosslinked elastomer having excellent physical properties, such as small creep (low creep) in compression set, tensile elongation set, etc., and excellent mechanical strength, such as tensile break strength and tensile break elongation, in a simple procedure omitting the post-crosslinking step at a high-level productivity while saving energy and time spent in the kneading step.

32 Claims, No Drawings

CROSSLINKED ELASTOMER AND PRODUCING PROCESS THEREOF

FIELD OF THE INVENTION

The present invention relates to crosslinked elastomer having excellent physical properties, such as small creep (low creep) in compression set, tensile elongation set, etc. and excellent mechanical strength, such as tensile break strength and tensile break elongation, and to a producing process thereof.

BACKGROUND OF THE INVENTION

The materials collectively referred to as rubber in diversified fields generally mean crosslinked rubber, which is obtained by mixing crude rubber with a filler, such as carbon black, or adducts, such as a crosslinking agent, and then crosslinking the crude rubber in the post-crosslinking step called as curing for the purpose of reinforcing the crude rubber. The post-crosslinking step is an indispensable step to confer mechanical strength, rubber elasticity, durability, etc. to rubber.

However, a process of producing the crosslinked rubber as a final product through the above step comprises numerous steps, and each step demands a great amount of energy and a considerable time, thereby raising the producing costs of the crosslinked rubber significantly.

To save the energy and time spent in the kneading step of kneading the crude rubber with the filler or adducts, a technique of lowering the viscosity of a blended product by adding adducts, such as lubricant, oil, low molecular weight compounds, to the crude rubber is adopted. However, when this technique is used, the adducts often give adverse effects to the physical properties of the crosslinked rubber. In case of liquid rubber, such as liquid polyisoprene and liquid polyurethane, the energy and time spent in the kneading step can be reduced to some extent, but there remains a problem that the cost of raw materials is high. Moreover, the post-crosslinking step is indispensable in this technique.

To solve the above problem, some processes which can simplify the crosslinking step have been proposed as an alternative of the above process of producing the crosslinked rubber from the crude rubber. For example, Japanese Laid-open Patent Application Nos. 74110/1981 (Tokukaisho No. 56-74110) and 179209/1982 (Tokukaisho No. 57-179209) disclose a process of producing ion crosslinked acrylic resin (acrylic rubber) by radical-polymerizing an acrylic-based monomer mixture containing a metal salt vinyl monomer. Since this producing process does not need the post-crosslinking step, crosslinked rubber (acrylic-based ion crosslinked elastomer) having excellent rubber elasticity and ductility can be produced in a simple procedure. In other words, since the acrylic-based monomer mixture containing the metal salt vinyl monomer, which is a crosslinking monomer, is radical-polymerized in the above producing process, the crosslinked rubber can be obtained in a so-called "1 pot" reaction.

However, according to the above conventional producing process, an amount of the metal salt vinyl monomer contained in the acrylic-based monomer mixture, that is, a concentration of the metal salt vinyl monomer, can be increased only to a certain limit. This means that, according to the above conventional producing process, if the crosslinking degree of the crosslinked rubber is increased, there is a limit for further improvements of the mechanical strength and other physical properties. Further, when the mechanical strength, such as tensile break strength and tensile break elongation, of the ion crosslinked rubber are improved (upgraded), the creep in compression set, tensile elongation set, etc. is undesirably increased in turn. Consequently, the crosslinked rubber obtained by the above conventional producing process has a problem in the physical properties that its creep becomes as large as the creep of non-crosslinked rubber.

On the other hand, since the acrylic rubber has excellent physical properties, such as heat resistance, oil resistance, and weather resistance, it can be used suitably and extensively as sealing materials, packing materials, hose materials, for automobiles, civil construction, marine vessels, etc. As disclosed in Japanese Laid-open Patent Application Nos. 312339/1988 (Tokukaisho No. 63-312339) and 218704/1990 (Tokukaihei No. 2-218704), the acrylic rubber is produced by subjecting crude rubber, obtained by suspension-polymerizing or emulsion-polymerizing an acrylic-based monomer, to the post-crosslinking (curing) through various techniques to improve the mechanical strength and rubber elasticity.

Nevertheless, the acrylic rubber is inferior to general rubber in the mechanical strength, such as tensile strength and tear strength. Also, when the acrylic rubber is produced, the post-crosslinking step using a crosslinking agent and the kneading step of kneading the crude rubber with a filler or adducts, such as a reinforcing material, are indispensable. Thus, the acrylic rubber is disadvantageous in workability and productivity.

Recently, to eliminate the drawbacks of the acrylic rubber and the producing process thereof, various kinds of acrylic-based elastomer of an ion crosslinking type containing metal salts have been proposed. A producing process of the acrylic-based ion crosslinked elastomer is disclosed in, for example, aforementioned Japanese Laid-open Patent Application Nos. 74110/1981 (Tokukaisho No. 56-74110) and 179209/1982 (Tokukaisho No. 57-179209), in which a monomer mixture, made of alkyl (meth)acrylate and metal salts of polymerizable unsaturated carboxylic acid, is radical-polymerized.

However, in the above conventional producing process of the acrylic-based ion crosslinked elastomer, it is difficult to dissolve a relatively large amount of metal salts of polymerizable unsaturated carboxylic acid into alkyl (meth) acrylate, in other words, it is difficult to raise a concentration of the metal salts in the monomer mixture to a relatively high level. Thus, although the acrylic-based elastomer can be produced by a simple procedure, the crosslinking degree of the same is unsatisfactory. Consequently, the resulting acrylic-based ion crosslinked elastomer has the same problem as the acrylic rubber that it is inferior in mechanical strength, such as tensile strength and tear strength. In addition, the acrylic-based elastomer of the ion crosslinking type with the improved mechanical strength generally has larger creep in the compression set, tensile elongation set, etc., and therefore, its rubber elasticity is unsatisfactory. Thus, the conventional acrylic-based ion crosslinked elastomer has a difficulty in improving both the mechanical strength and physical properties, such as creep, in a well balanced manner, and for this reason, the acrylic-based ion crosslinked elastomer has not been put into practical use yet.

A relatively large amount of metal salts of polymerizable unsaturated carboxylic acid can be dissolved into alkyl (meth)acrylate with the use of a solubilizing agent. In this case, however, the performance (physical properties) of the resulting acrylic-based ion crosslinked elastomer is deteriorated by the solubilizing agent. When an amount of metal salts of the polymerizable unsaturated carboxylic acid contained in the monomer mixture is merely increased, although the mechanical strength and the like can be improved, the creep in the compression set, tensile elongation set, etc. can not be reduced.

SUMMARY OF THE INVENTION

It is therefore a first object of the present invention to provide a process of producing inexpensive crosslinked elastomer having excellent physical properties, such as small creep (low creep) in compression set, tensile elongation set, etc. and excellent mechanical strength, such as tensile break strength and tensile break elongation, at a high-level productivity in a simple procedure omitting the post-crosslinking step while saving energy and time spent in the kneading step.

To fulfill the first object, the inventors of the present invention carried out assiduous study of a producing process of the crosslinked elastomer. In due course, the inventors achieved the present invention when they discovered that inexpensive crosslinked elastomer noticeably exhibiting a reinforcement effect accrued by blending microscopic particles, that is, the crosslinked elastomer which fulfills the above object, can be produced in a simple procedure at a high-level productivity by producing a blended composition by letting a monomer composition, mainly composed of alkyl (meth)acrylate and including a compound having a plurality of polymeric groups within a molecule, contain microscopic particles, such as carbon black, whose average primary particle size is in a range between 1 nm and 200 nm, and then polymerizing the blended composition.

To fulfill the first object, a producing process of crosslinked elastomer of the present invention is characterized in that, a blended composition is produced first by letting a monomer composition, including a compound having a plurality of polymeric groups within a molecule, contain microscopic particles whose average primary particle size is in a range between 1 nm and 200 nm, and then the resulting blended composition is polymerized.

According to the above process, the blended composition is produced first by letting the monomer composition contain the microscopic particles, and then the blended composition is polymerized. In other words, the crosslinked elastomer is produced by polymerizing the monomer composition, that is, the blended composition, in the presence of the microscopic particles. Thus, the adhesion strength between the microscopic particles and the polymer (matrix) of crosslinked elastomer obtained by the above process is larger than the adhesion strength between the crude rubber and the filler in the conventional crosslinked rubber. Thus, the reinforcement effect of the microscopic particles per unit weight is larger than the reinforcement effect of the filler. Consequently, with the resulting crosslinked elastomer, the reinforcement effect accrued by blending the microscopic particles is acknowledged noticeably. For example, tensile break strength can be improved significantly without substantially lowering the tensile break elongation. Also, according to the above process, the blended composition is produced by letting the monomer composition contain the microscopic particles. Thus, far less energy and time are demanded to obtain the blended composition compared with the conventional producing process including the kneading step of kneading the crude rubber with the filler or the like. In other words, according to the producing process of the present invention, the blended composition can be obtained with far less energy and time compared with those spent in the conventional kneading step.

Consequently, it has become possible to produce inexpensive crosslinked elastomer having excellent physical properties, such as small creep (low creep) in compression set, tensile elongation set, etc., and excellent mechanical strength, such as tensile break strength and tensile break elongation, at a high-level productivity in a simple procedure omitting the post-crosslinking step while saving energy and time spent in the kneading step.

It is a second object of the present invention to provide crosslinked elastomer having excellent physical properties, such as small creep (low creep) in compression set, tensile elongation set, etc., heat resistance, oil resistance, weather resistance, and transparency, and excellent mechanical strength, such as tensile strength and tear strength, and to provide a process of producing the above crosslinked elastomer in a simple procedure inexpensively at a high-level productivity.

To fulfill the second object, the inventors of the present invention carried out assiduous study of the crosslinked elastomer and a producing process thereof. In due course, the inventors achieved the present invention when they discovered that crosslinked elastomer which fulfills the above object can be produced in a simple procedure inexpensively at a high-level productivity by obtaining a monomer mixture containing a metal salt monomer first by reacting a metal compound and a carboxyl-group-containing vinyl monomer in the presence of at least one kind of monomer selected from the group consisting of alkyl (meth) acrylate, a polyfunctional vinyl monomer, a vinyl-group-containing polymer, and a monofunctional vinyl monomer copolymerizable with these monomers, then ultimately producing a monomer composition containing alkyl (meth) acrylate, the polyfunctional vinyl monomer and/or vinyl-group-containing polymer, and metal salt monomer without separating the metal salt monomer from the monomer mixture, and polymerizing the resulting monomer composition.

To fulfill the second object, a producing process of crosslinked elastomer of the present invention is characterized by obtaining a monomer mixture containing a metal salt monomer first by reacting a metal compound and a carboxyl-group-containing vinyl monomer in the presence of at least one kind of monomer selected from the group consisting of alkyl (meth)acrylate, a polyfunctional vinyl monomer, a vinyl-group-containing polymer, and a monofunctional vinyl monomer copolymerizable with these monomers, then ultimately producing a monomer composition containing alkyl (meth)acrylate, the polyfunctional vinyl monomer and/or vinyl-group-containing polymer, and metal salt monomer without separating the metal salt monomer from the monomer mixture, and polymerizing the resulting monomer composition.

According to the above process, since the monomer mixture containing the metal salt monomer is obtained, the solubility of the metal salt monomer is improved, and hence, a concentration of the metal salt monomer in the resulting monomer composition can be increased from the conventional concentration without using, for example, a solubilizing agent. Thus, compared with the conventional process, a larger amount of the metal salts can be introduced into the polymer matrix of the resulting crosslinked elastomer in a stable manner by polymerizing the monomer composition. In other words, the ion crosslinking degree of the resulting crosslinked elastomer can be increased satisfactorily. Therefore, it has become possible to produce crosslinked elastomer having excellent mechanical strength, such as tensile strength and tear strength, and physical properties, such as heat resistance, oil resistance, weather resistance, and transparency.

Also, since the monomer composition contains the polyfunctional vinyl monomer or vinyl-group-containing polymer in addition to the metal salt monomer, the creep in the compression set, tensile elongation set, etc. of the resulting crosslinked elastomer can be reduced (to low creep) while maintaining the satisfactory performance (physical properties) rendered to the conventional acrylic-based ion crosslinked elastomer.

Further, in case that the monomer composition contains both the metal salt monomer and vinyl-group-containing polymer, not only adequate viscosity can be conferred to the monomer composition, but also the viscosity can be controlled by, for example, exploiting the thickening effect accruing from adding a thickener. Thus, miscibility and dispersion stability of adducts of various kinds optionally added to the monomer composition can be improved while the handling and molding properties, workability, productivity, etc. can be further improved when the monomer composition is polymerized. In case that the monomer composition contains both the polyfunctional vinyl monomer and vinyl-group-containing polymer, the mechanical strength and the physical properties, such as creep, can be balanced particularly in a satisfactory manner.

Furthermore, according to the above process, the crosslinked elastomer can be produced from raw materials (monomers of various kinds), which altogether form the monomer composition, in a so-called "1 pot" reaction. In short, according to the above process, the post-crosslinking step can be omitted. Thus, inexpensive crosslinked elastomer can be produced in a simple procedure at a high-level productivity.

Consequently, it has become possible to produce crosslinked elastomer having not only excellent physical properties, such as small creep in compression set, tensile elongation set, etc., but also excellent mechanical strength. In addition, a producing process of such inexpensive crosslinked elastomer in a simple procedure at a high-level productivity can be provided.

Other objects, features, advantages of the present invention will be clearly understood by the ensuing detailed description. Also, the benefits of the present invention will be apparent in the ensuing explanation.

DESCRIPTION OF THE EMBODIMENTS

A producing process of crosslinked elastomer ((meth)acrylic-based crosslinked elastomer) of the present invention is a process of producing a blended composition first by letting a monomer composition mainly composed of alkyl (meth)acrylate contain microscopic particles, such as carbon black, having an average primary particle size in a range between 1 nm and 200 nm, and then polymerizing the resulting blended composition. The monomer composition referred herein is a composition composed of a compound having a plurality of polymeric groups within a molecule (hereinafter, referred to as polyfunctional compound), and a compound having a single polymeric group within a molecule (hereinafter, referred to as monofunctional compound).

The crosslinked elastomer of the present invention is produced by obtaining a monomer mixture containing a metal salt monomer first by reacting a metal compound and a carboxyl-group-containing vinyl monomer in the presence of at least one kind of monomer selected from the group consisting of alkyl (meth)acrylate, a polyfunctional vinyl monomer, a vinyl-group-containing polymer, and a monofunctional vinyl monomer copolymerizable with these monomers, then ultimately producing a monomer composition containing alkyl (meth)acrylate, the polyfunctional vinyl monomer and/or vinyl-group-containing polymer, and metal salt monomer without separating the metal salt monomer from the monomer mixture, and polymerizing the resulting monomer composition.

Here, alkyl (meth)acrylate is particularly preferable as the monofunctional compound. Examples of alkyl (meth)acrylate include, but not limited to:
  alkyl acrylate, such as methyl acrylate, ethyl acrylate, n-butyl acrylate, and 2-ethyl hexyl acrylate;
  alkyl methacrylate, such as methyl methacrylate, ethyl methacrylate, n-butyl methacrylate, and 2-ethyl hexyl methacrylate; etc.

One member or a mixture of two or more members selected from these example compounds can be used effectively. Of all these examples, alkyl (meth)acrylate mainly composed of ethyl acrylate and/or n-butyl acrylate, and alkyl (meth)acrylate composed of a combination of ethyl acrylate and/or n-butyl acrylate, and alkyl methacrylate are more preferable than the others.

A ratio of alkyl (meth)acrylate in the monomer composition is preferably in a range between 30 wt % and 99 wt % on the basis of a total weight of the monomer composition. Note that, however, when the monomer composition contains the vinyl-group-containing polymer in addition to the metal salt monomer, a ratio of alkyl (meth)acrylate is preferably in a range between 30 wt % and 98.5 wt %. When the ratio is below 30 wt %, the physical properties, especially heat resistance, oil resistance, weather resistance, etc. of the resulting crosslinked elastomer (hereinafter, referred to simply as elastomer), may deteriorate.

Also, besides alkyl (meth)acrylate, a compound copolymerizable with alkyl (meth)acrylte or the polyfunctional compound, that is, a monofunctional vinyl monomer, can be used as the monofunctional compound. In other words, in the present invention, both alkyl (meth)acrylate and the monofunctional vinyl monomer can be used as the monofunctional compound.

The monofunctional vinyl monomer of the present invention is a vinyl monomer having a single vinyl group within a molecule, and it is a compound copolymerizable with alkyl (meth)acrylate, the polyfunctional vinyl monomer, vinyl-group-containing polymer, and metal salt monomer. Note that, however, in the present invention, alkyl (meth)acrylate and a carboxyl-group-containing vinyl monomer are not included to the monofunctional vinyl monomer.

Examples of the monofunctional vinyl monomer include, but not limited to:
  aromatic vinyl compounds, such as styrene, vinyl toluene, and α-methylstyrene;
  alkoxy alkyl acrylate, such as methoxyethyl acrylate, ethoxyethyl acrylate, and butoxyethyl acrylate;
  alkoxy alkyl methacrylate, such as methoxyethyl methacrylate, ethoxyethyl methacrylate, and butoxyethyl methacrylate;
  epoxy-group-containing vinyl compounds, such as glycidyl (meth)acrylate and allyl glycidyl ether;
  halogen-group-containing vinyl compounds, such as vinyl chloroacetate, allyl chloroacetate, and vinyl benzyl chloride;
  hydroxyl-group-containing vinyl compounds, such as 2-hydroxyethyl(meth)acrylate, 2-hydroxypropyl(meth)acrylate, and ethylene glycol monoallyl ether;

amide-group-containing vinyl compounds, such as acrylamide and methacrylamide;

amino-group-containing vinyl compounds, such as dimethyl aminoethyl (meth)acrylate;

silyl-group-containing vinyl compounds, such as vinyl methoxy silane and vinyl ethoxy silane;

maleimides, such as cyclohexyl maleimide and phenyl maleimide;

nitrile-group-containing vinyl compounds, such as acrylonitrile and methacrylonitrile;

alicyclic vinyl compounds, such as dicyclopentadiene and ethylidene norbornene;

vinyl ester carboxylate, such as vinyl acetate and vinyl propionate;

olefin compounds, such as chloroprene and isoprene; etc.

One member or a mixture of two or more members selected from these example compounds can be used effectively.

In case that the polyfunctional vinyl monomer and/or monofunctional vinyl monomer are used, a ratio of these vinyl monomers in the monomer composition is greater than 0 wt % and not greater than 68.5 wt % on the basis of a total weight of the monomer composition. Note that, however, in case that the monofunctional vinyl monomer alone is used, a ratio of the monofunctional vinyl monomer in the monomer composition is greater than 0 wt % and not greater than 69 wt % on the basis of a total weight of the monomer composition. In case that the monomer composition contains the polyfunctional vinyl monomer, the mechanical strength and physical properties, such as creep, of the resulting elastomer are balanced particularly in a satisfactory manner.

The polyfunctional compound referred in the present invention is, for example, a compound having a plurality of vinyl groups within a molecule. In other words, examples of the polyfunctionl vinyl monomer include, but not limited to:

bifunctional vinyl compounds, such as ethylene glycol di(meth)acrylate, diethylene glycol di(meth)acrylate, a di(meth)acrylate compound of ethylene glycol diphthalate, a di(meth)acrylate compound of diethylene glycol diphthalate, divinyl benzene, and a diglycidyl (meth)acrylate compound of dimer acid;

trifunctional vinyl compounds, such as trimethylol propane tri(meth)acrylate; etc.

One member or a mixture of two or more members selected from these example compounds can be used effectively. The polyfunctional vinyl monomer is a compound copolymerizable with alkyl (meth)acrylte, the vinyl-group-containing polymer, and metal salt monomer. Note that, however, in the present invention, the polyfunctional vinyl monomer does not include the vinyl-group-containing polymer.

A ratio of the polyfunctional vinyl monomer in the monomer composition is preferably in a range between 0.5 wt % and 10 wt % on the basis of a total weight of the monomer composition. A ratio below 0.5 wt % is not preferable, because the resulting elastomer has larger creep in the compression set, tensile elongation set, etc. and its rubber elasticity becomes unsatisfactory. A ratio over 10 wt % is not preferable either, because the mechanical strength or the elongation of the resulting elastomer deteriorates, and as a consequence, its tenacity becomes too poor.

Besides the polyfunctional vinyl monomer, a polymer having a plurality of vinyl groups within a molecule, that is, a vinyl-group-containing polymer, can be used as the polyfunctional compound. In other words, in the present invention, a polyfunctional vinyl monomer and/or a vinyl-group-containing polymer can be used as the polyfunctional compound.

The vinyl-group-containing polymer is not especially limited as long as being a polymer soluble to and copolymerizable with the other components that form the monomer composition of the present invention together with the vinyl-group-containing polymer. To be more specific, the vinyl-group-containing polymer can be any polymer having a number average molecular weight (Mn) of 500 or more and at least two vinyl groups participating in the polymerization reaction at the side chain and/or end terminal. A synthesizing method of the vinyl-group-containing polymer is not especially limited. Examples of the vinyl-group-containing polymer are: a polymer based on (meth)acrylte, polyvinyl ester, unsaturated polyester, or compositions obtained by dissolving these polymers into a vinyl monomer, such as styrene and alkyl (meth)acrylate.

Here, it is the vinyl group portion of the vinyl-group-containing polymer that takes part in the polymerization reaction of the monomer composition. Thus, the vinyl-group-containing polymer can be deemed as one kind of monomer in the polymerization reaction, and for this reason, in the present invention, the vinyl-group-containing polymer is deemed as a monomer.

The polymer based on (meth)acrylate is not especially limited, and an example of which is a synthesis compound obtained by vinyl-polymerizing a mixture of the vinyl compound mainly composed of alkyl (meth)acrylate first by known methods, such as the solution polymerization, bulk polymerization, suspension polymerization, and emulsion polymerization, and then introducing vinyl groups to the resulting polymer (hereinafter, referred to as polymer A). Examples of the vinyl compounds other than alkyl (meth)acrylate in the above mixture include, but not limited to: (meth)acrylic acid, styrene, acrylonitrile, maleimdes, etc.

The vinyl groups can be introduced to the polymer A by the following example methods: ① a method of reacting the polymer A with glycidyl (meth)acrylate when the polymer A has a carboxyl group; ② a method of reacting the polymer A with polyfunctional isocyanate, such as toluene diisocyanate, and then reacting the resulting reaction product with hydroxyl-group-containing vinyl monomer, such as hydroxylethyl (meth)acrylate when the polymer A includes a hydroxyl group; etc. In these example methods, a catalyst, a polymerization inhibitor or the like can be used optionally.

Also, for example, (meth)acrylic syrup containing the polymer based on (meth)acrylate can be obtained by bulk-polymerizing a mixture of a vinyl compound mainly composed of aforementioned alkyl (meth)acrylate, and then introducing vinyl groups to polymer syrup (a mixture of the polymer A and unreacted alkyl (meth)acrylate) obtained by suspending the above polymerization reaction. In this case, the resulting (meth)acrylic syrup contains alkyl (meth)acrylate. Thus, when the monomer composition is produced, an amount of alkyl (meth)acrylate contained in the (meth)acrylic syrup should be concerned. In other words, an amount of used (meth)acrylic syrup should be determined so that alkyl (meth)acrylate is contained in the monomer composition in a desired ratio.

Examples of polyvinyl ester include, but not limited to, known polyvinyl esters, such as epoxy-based vinyl ester, urethane-based vinyl ester, and polyester-based vinyl ester. Epoxy-based vinyl ester is a compound obtained by reacting epoxy resin with (meth) acrylic acid, and examples of which include glycidyl ether compounds of bisphenols or novlak phenols, etc. Urethane-based vinyl ester is a compound obtained by reacting a polyisocyanate compound with hydroxyalkyl (meth)acrylate, and examples of which include toluene diisocyanate, xylylene diisocyanate, etc.

Examples of polyester-based vinyl ester include a compound obtained by reacting oligo ester having carboxyl groups at both the end terminals with glycidyl (meth)acryalte, a compound obtained by reacting oligo ester having hydroxyl groups at both the end terminals with (meth)acrylic acid, etc.

Unsaturated polyester is not especially limited, and an example of which is a known compound obtained by condensing an acid component and an alcohol component. Reaction conditions of the condensation reaction are not especially limited, either. Examples of the acid component include:

saturated polybasic acids, such as phthalic acid, phthalic anhydride, isophthalic acid, and adipic acid, and anhydrides of these acids;

unsaturated polybasic acids, such as maleic acid and fumaric acid, and anhydrides of these acids; etc.

Examples of the alcohol component include:

bifunctional alcohols, such as ethylene glycol and propylene glycol;

trifunctional alcohols, such as trimethylolpropane;

monoepoxides, such as ethylene oxide and propylene oxide; etc.

Unsaturated polyester may be denatured by compounds, for example, diene compounds, such as dicyclopentadiene, a rubber component of butadiene-acrylonitrile copolymer having a functional group at the end terminal, etc.

One member or a mixture of two or more members selected from the above example vinyl-group-containing polymers can be used effectively. Of all these examples, the polymer based on (meth)acrylate is more preferable than the others. A ratio of the vinyl-group-containing polymer in the monomer composition is preferably in a range between 1 wt % and 50 wt % on the basis of a total weight of the monomer composition. A ratio below 1 wt % is not preferable, because the resulting elastomer has larger creep in the compression set, tensile elongation set, etc. and its rubber elasticity becomes unsatisfactory. A ratio over 50 wt % is not preferable either, because the mechanical strength or the elongation of the resulting elastomer deteriorates, and as a consequence, its tenacity becomes too poor.

When the vinyl-group-containing polymer is used as the polyfunctional compound, adequate viscosity can be conferred to the monomer composition; moreover, since the viscosity can be adjusted by exploiting the thickening effect accrued from adding a thickener, the dispersion stability of microscopic particles of the present invention, and the miscibility and dispersion stability of optional adducts of various kinds (which will be described below) with respect to the monomer mixture can be improved. Furthermore, the handling and molding properties, workability, productivity, etc. when the monomer composition or blended composition is polymerized can be further improved.

The metal salt monomer (metal salt vinyl compound) is a reaction product (salt) of a metal compound and a carboxyl-group-containing vinyl monomer. Examples of the metal compound include, but not limited to:

inorganic metal compounds, such as metal oxide, metal hydroxide, metal chloride, and metal carbonate;

organic metal compounds, such as the metal salt of carboxylic acid including metal salt acetate, a complex including acetylaceton complex, and metal alcolate including metal propylate and metal butylate; etc.

One member or a mixture of two or more members selected from these example compounds can be used effectively. The above metal can be either monovalent metal or polyvalent metal.

Of all these examples, metal oxide and metal hydroxide are more preferable than the others, and polyvalent metal oxide and polyvalent metal hydroxide are further preferable because they have better reactivity with the carboxyl-group-containing vinyl monomer.

Besides the polyfunctional vinyl monomer and vinyl-group-containing polymer, a metal salt monomer containing polyvalent metal can be also used as the polyvalent compound. In other words, in the present invention, the metal salt monomer can be used alone as the polyfunctional compound, or a mixture of the metal salt monomer and polyfunctional vinyl monomer and/or vinyl-group-containing polymer can be used as the polyfunctional compound.

Examples of the polyvalent metal oxide include, but not limited to: zinc oxide (zinc flower) and magnesium oxide. Examples of the polyvalent metal hydroxide include, but not limited to: zinc hydroxide, magnesium hydroxide, aluminium hydroxide, calcium hydroxide, etc. When the polyvalent metal oxide or polyvalent metal hydroxide is used, the physical properties and mechanical strength of the resulting elastomer can be further improved.

The carboxyl-group-containing vinyl monomer of the present invention can be any kind of vinyl monomer having a carboxyl group within a molecule, and examples of which include, but not limited to:

$\alpha$, $\beta$-ethylenic unsaturated carboxylic acids, such as acrylic acid, methacrylic acid, crotonic acid, and cinammic acid;

unsaturated carboxylic acids having an ester group, such as 2-acryloyloxyethyl phthalic acid, 2-methacryloyloxyethyl phthalic acid, 2-methacryloyloxyethyl trimellitic acid, and 2-methacryloyloxyethyl pyromellitic acid;

unsaturated dicarboxylic acids, such as maleic acid, fumaric acid, and itaconic acid;

monoester of unsaturated dicarboxyilic acid and monohydroxy alcohol, such as monomethyl ester malate; etc.

One member or a mixture of two or more members selected from these example compounds can be used effectively. Of all these example compounds and a mixture thereof, a mixture of acrylic acid and methacrylic acid is most preferred.

The metal salt monomer can be readily obtained by reacting the above metal compound with the carboxyl-group-containing vinyl monomer in the presence of the other components forming the monomer composition of the present invention together with the metal salt monomer either partially or entirely (hereinafter, the components other than the metal salt monomer is referred to as selection monomer). The above reaction can take place in the presence of a dispersion material obtained by blending and dispersing the microscopic particles of the present invention or adducts or synthetic resin of various kinds (which will be described below) optionally added to the monomer composition. The reaction method will be described below.

Alternatively, the metal salt monomer can be readily obtained by reacting the metal compound with the carboxyl-group-containing vinyl monomer in the presence of at least one kind of monomer (selection monomer) selected from the group consisting of alkyl (meth)acrylate, vinyl-group-containing polymer, polyfunctional vinyl monomer, and monofunctional vinyl monomer.

The selection monomer referred herein means:

①  alkyl (meth)acrylate alone;

②  polyfunctional vinyl monomer alone;

③ monofunctional vinyl monomer alone;
④ vinyl-group-containing polymer alone;
⑤ a mixture of alkyl (meth)acrylate and the polyfunctional vinyl monomer and/or monofunctional vinyl monomer;
⑥ a mixture of the polyfunctional vinyl monomer and monofunctional vinyl monomer;
⑦ a mixture of alkyl (meth)acrylate and the vinyl-group-containing polymer;
⑧ a mixture of the vinyl-group-containing polymer, polyfunctional vinyl monomer and/or monofunctional vinyl monomer; and
⑨ a mixture of alkyl (meth)acryalte, the vinyl-group-containing polymer, polyfunctional vinyl monomer and/or monofunctional vinyl monomer.

In case that the selection monomer is composed of alkyl (meth)acrylate alone, an amount of alkyl (meth)acrylate is either a total amount to be contained in the resulting monomer composition or a part thereof. In short, the selection monomer in the present invention is either a part of or all the components of the resulting monomer composition excluding the metal salt monomer.

A ratio of the metal salt monomer in the monomer composition is preferably in a range between 0.5 wt % and 20 wt % on the basis of a total weight of the monomer composition. A ratio below 0.5 wt % is not preferable, because the mechanical strength of the resulting elastomer deteriorates. A ratio over 20 wt % is not preferable either, because the resulting elastomer has larger creep. Thus, an amount of used metal compound and carboxyl-group-containing vinyl monomer can be set in such a manner that the metal salt monomer is contained in the monomer mixture in the above range.

An equivalent ratio of the carboxyl-group-containing vinyl monomer and metal compound (carboxyl-group-containing vinyl monomer/metal compound) is not especially limited, and can be set arbitrarily depending on the chemical make-up of the carboxyl-group-containing vinyl monomer, kinds of the metal compound, a combination thereof, the intended use of the elastomer, the required physical properties of the elastomer, etc.; however, a range between 1.0 and 1.2 is preferable.

Also, it is preferable to use a mixture of at least two kinds of compounds as the carboxyl-group-containing vinyl monomer, and it is particularly preferable to use a mixture of acrylic acid and methacrylic acid. In case that a mixture of two kinds of compounds is used as the carboxyl-group-containing vinyl monomer, a mole ratio of the two compounds is preferably in a range between 0.2/0.8 and 0.8/0.2, and a mole ratio of almost 1/1 is particularly preferable. When a mixture of two or more kinds of compounds is used, the solubility of the resulting metal salt monomer into the selection monomer is further improved compared with a case of using only one kind of compound, thereby making it possible to produce a monomer composition with further improved stability. In other words, when a mixture of two or more kinds of compounds is used as the carboxyl-group-containing vinyl monomer, a larger amount of the metal salt monomer can be dissolved into the selection monomer. The reason why the solubility of the metal salt monomer is further improved when a mixture of two or more kinds of compounds is used is not clear, but it is assumed that because double salts, in which different kinds of compounds bond to a single polyvalent metal, that is, the metal salt monomer, produced in the above reaction have inferior crystallization.

A method of reacting the metal compound with the carboxyl-group-containing vinyl monomer in the presence of the selection monomer is not especially limited, and for example, a method of mixing the metal compound with the carboxyl-group-containing vinyl monomer in the selection monomer first, and then stirring the resulting mixture at normal temperature or with heating is adoptable. According to this method, the metal salt monomer is produced as the reaction of these compounds proceeds, and the monomer mixture is obtained in a state where the metal salt monomer is dissolved into the selection monomer. A method of mixing the metal compound and carboxyl-group-containing vinyl monomer with the selection monomer is not especially limited. For example, adoptable methods are:

① a method of mixing the metal compound with the selection monomer first, and then mixing the resulting mixture with the carboxyl-group-containing vinyl monomer;
② a method of mixing the carboxyl-group-containing vinyl monomer with the selection monomer first, and then mixing the resulting mixture with the metal compound;
③ a method of mixing the metal compound and carboxyl-group-containing vinyl monomer simultaneously with the selection monomer; etc.

When the used metal compound is insoluble to the selection monomer and/or monomer mixture, whether the reaction of the metal compound with the carboxyl-group-containing vinyl monomer has completed or not can be confirmed whether the resulting monomer mixture is homogeneous and transparent at normal temperature. That is, the point when the homogeneous and transparent monomer mixture is obtained at normal temperature is the end of the above reaction. Thus, the manipulation, such as stirring, can be stopped at that point. The reaction conditions, such as reaction temperature and reaction time, are not especially limited as long as the above reaction can proceed and the selection monomer and monomer mixture can remain the same.

In addition, water may be added to the reaction series optionally in the above reaction. In other words, the metal compound can be reacted with the carboxyl-group-containing vinyl monomer in the presence of the selection monomer and water. When the above reaction takes place in the presence of water, not only the reaction can proceed faster and smoother, but also the solubility of the resulting metal salt monomer into the selection monomer can be further improved. An amount of added water is not especially limited, but it is preferable that 4.0 mole or less of water is added to 1 mole of the metal compound. The reason why the above effect can be achieved by adding water is not clear; however, it is assumed that the metal salt monomer is turned into a soluble compound when the metal salt monomer is coordinated with water.

Further, a solubilizing agent may be added optionally to the reaction series in the above reaction. In other words, the metal compound can be reacted with carboxyl-group-containing vinyl monomer in the presence of the selection monomer and solubilizing agent. When the reaction takes place in the presence of the solubilizing agent, the same effect as the one attained in case of the reaction taking place in the presence of water can be achieved. An amount of added solubilizing agent is not especially limited.

The solubilizing agent is not especially limited, and can be any compound generally known as a solubilizing agent of the metal salt monomer. Examples of the solubilizing agent include: carboxylic acid having a long-chain hydrocarbon group or an alicyclic hydrocarbon group; a sulfur-containing organic compound having a thiol group; a nitrogen-containing organic compound, such as an amine compound, an imine compound, an amide compound, an ammonium compound, a nitrogen-containing heterocyclic compound; etc. One member or a mixture of two or more members selected from these example compounds can be used effectively. Further, water and solubilizing agent can be used additionally.

According to the above reaction method, since the metal salt monomer is obtained as being dissolved into the selection monomer, the concentration of the metal salt monomer in the monomer mixture can be readily increased to a relatively high level. In other words, since the concentration of the metal salt monomer in the resulting monomer composition can be increased to a relatively high level, the ion crosslinking degree of the resulting elastomer can be increased satisfactorily. Thus, it has become possible to produce elastomer with improved mechanical strength and the elongation, thereby having excellent tenacity.

The above monomer mixture is mixed with other components optionally so that a desired monomer composition can be produced ultimately. According to the above method, the monomer composition of the present invention can be obtained without separating the metal salt monomer from the monomer mixture. Since the monomer composition has excellent stability, the metal salt monomer does not precipitate when it is allowed to stand for a long period. In addition, the monomer composition neither becomes viscous nor turns into gel.

To be more specific, for example, the monomer mixture is optionally mixed with alkyl (meth)acrylate, the vinyl-group-containing polymer, polyfunctional vinyl monomer, and monofunctional vinyl monomer. In other words, alkyl (meth)acrylate, the vinyl-group-containing polymer, polyfunctional vinyl monomer, metal salt monomer, and monofunctional vinyl monomer are mixed with the monomer mixture so that these monomers are mixed in desired ratios (chemical make-up ratios) in an adequate manner.

For example, in case that the selection monomer is composed of alkyl (meth)acrylate alone, the monomer composition is produced by mixing the resulting monomer mixture with the polyfunctional vinyl monomer, and optionally the monofunctional vinyl monomer. Alternatively, the monomer composition is produced by mixing the resulting monomer mixture with the vinyl-group-containing polymer, and optionally monofunctional vinyl monomer and/or polyfunctional vinyl monomer.

As previously mentioned, the selection monomer is a part of or all the other components that form the monomer composition ultimately together with the metal salt monomer. Thus, to produce a desired monomer composition, the monomer mixture is mixed with alkyl (meth)acrylate, the vinyl-group-containing polymer, polyfunctional vinyl monomer, monofunctional vinyl monomer in necessary amounts. Note that, however, in case that the selection monomer is all the other components excluding the metal salt monomer, the resulting monomer mixture is the desired monomer composition. Thus, it is not necessary to mix the monomer mixture with alkyl (meth)acrylate, the vinyl-group-containing polymer, polyfunctional vinyl monomer, and monofunctional vinyl monomer.

As has been explained, the monomer composition of the present invention can be produced by mixing the monomer mixture with alkyl (meth)acrylate, the vinyl-group-containing polymer, polyfunctional vinyl monomer, and monofunctional vinyl monomer in necessary amounts without separating the metal salt monomer from the monomer mixture. In other words, a monomer composition including 30 wt %–99 wt % of alkyl (meth)acrylate, 0.5 wt %–10 wt % of a polyfunctional vinyl monomer, 0.5 wt %–20 wt % of a metal salt monomer, and optionally 0 wt %–69 wt % of a monofunctional vinyl monomer (on the basis of a total of 100 wt %) is produced. Alternatively, a monomer composition including 30 wt %–98.5 wt % of alkyl (meth)acrylate, 1 wt %–50 wt % of a vinyl-group-containing polymer, 0.5 wt %–20 wt % of a metal salt monomer, and optionally 0 wt %–68.5 wt % of a monofunctional vinyl monomer and/or a polyfunctional vinyl monomer (on the basis of a total of 100 wt %) is produced.

As has been explained, in the present invention, at least one kind of compound selected from the group consisting of the polyfunctional vinyl monomer, vinyl-group-containing polymer, and metal salt monomer can be used as the polyfunctional compound. Of all these compounds, a mixture of the polyfunctional vinyl monomer and/or vinyl-group-containing polymer, and metal salt monomer is preferable, because the mechanical strength and physical properties, such as creep, of the resulting elastomer can be improved in a well balanced manner. A mixture of the vinyl-group-containing polymer and metal salt monomer is particularly preferable, because not only adequate viscosity can be conferred to the monomer composition, but also the viscosity can be adjusted by, for example, exploiting the thickening effect accruing from adding a thickener, so that the dispersion stability of the microscopic particles of the present invention in the monomer composition, and the handling property when the monomer composition or the resulting blended composition is polymerized can be further improved.

Also, synthetic resin soluble or dispersive into the monomer composition may be optionally added to the monomer composition. In other words, the monomer composition or blended composition can optionally include the synthetic resin. In case that the monomer composition or blended composition includes the synthetic resin, the solubility and dispersion stability of the metal salt monomer can be further improved when the monomer composition includes the metal salt monomer as the polyfunctional compound, thereby making it possible to increase the concentration of the metal salt monomer to a higher level. Furthermore, the dispersion stability of the microscopic particles of the present invention with respect to the monomer composition, or the dispersion stability of adducts of various kinds optionally added to the monomer composition or blended composition can be further improved. In addition, since adequate viscosity can be conferred to the monomer composition or blended composition, the handling and molding properties, workability, productivity, etc. of the monomer composition or blended composition can be further improved.

The synthetic resin is not especially limited, and can be any kind of synthetic resin as long as it can dissolve or disperse into the monomer composition and does not impair the performance (physical properties) that should be rendered to the elastomer obtained by polymerizing the monomer composition or blended composition. An amount of added synthetic resin is not especially limited, either. In case that the synthetic resin is added to the monomer composition, the monomer composition is polymerized in the presence of the synthetic resin. In case that the blended composition contains the synthetic resin, the monomer composition is polymerized in the presence of the microscopic particles and synthetic resin.

Examples of the synthetic resin include known synthetic resins:

- acrylic resins, such as polyalkyl(meth)acryalte resin and acrylic rubber;
- polyolefin resins, such as polyethylene-based resin, polypropylene-based resin, a diene-based polymer;
- polyester resin;
- epoxy resin;
- polystyrene resin; etc.

One member or a mixture of two or more members selected from these example synthetic resins can be used effectively. Of all these examples, acrylic resin is more preferable than the others, because the transparency of the resulting elastomer can be further improved. Note that, however, in the present invention, the synthetic resin does not include the vinyl-group-containing polymer.

The polyalkyl(meth)acrylate resin can be, for example, the aforementioned polymer syrup obtained by bulk-polymerizing a monomer mixture containing alkyl (meth) acrylate and stopping the polymerization reaction at the halfway. In this case, the polymer syrup includes unreacted alkyl (meth)acrylate. Thus, when the polymer syrup is added to the monomer composition, an amount of alkyl (meth) acrylate contained in the polymer syrup should be concerned. In other words, an amount of added polymer syrup should be determined so that alkyl (meth)acrylate is contained in the monomer composition in a desired ratio. A synthesizing method of the polymer syrup is not especially limited.

The microscopic particles of the present invention are not especially limited as long as their average primary particle size is in a range between 1 nm and 200 nm, more preferably, in a range between 10 nm and 100 nm. Examples of the microscopic particles are: inorganic particles of various kinds, organic particles of various kinds, and inorganic/organic composite particles, all of which are used as a typical filler and kneaded with the crude rubber to reinforce the rubber. When the microscopic particles are blended into the monomer composition, in other words, when the blended composition is produced by letting the monomer composition contain the microscopic particles, and then the elastomer is produced by polymerizing the blended composition, the physical properties of the resulting elastomer can be further improved compared with the conventional elastomer (crosslinked rubber) in which the microscopic particles are not blended. To be more specific, by exploiting the reinforcement effect accruing from mixing the microscopic particles, for example, the tensile break strength can be improved significantly without substantially degrading the tensile break elongation. A shape of the microscopic particles is not especially limited.

When the microscopic particles have an average particle size smaller than 1 nm, the dispersion stability in the monomer composition becomes too poor to prepare the blended composition in a stable manner. On the other hand, when the microscopic particles have an average particle size greater than 200 nm, it becomes difficult to improve the physical properties of the resulting elastomer by polymerizing the blended composition containing the microscopic particles regardless of its blended amount. To be more specific, since the reinforcement effect accruing from blending the microscopic particles becomes so poor that, for example, the tensile break elongation is reduced when the tensile break strength is hardly improved, or even if the tensile break strength is improved, there occur inconveniences such that the tensile break elongation is considerably reduced because the hardness or tensile elastic modulus is increased. Thus, when the average primary particle size of the microscopic particles is out of the above range, the effect of improving the physical properties of the elastomer is marginal.

Examples of the microscopic particles include: carbon black, such as furnace black, channel black, and acethylene black; polymer graft type carbon black obtained by treating the above carbon black with a polymer, including,

- ① polymer graft type carbon black obtained by reacting carbon black with a polymer, such as poly(meth) acrylate, having a reactive group reactive with carbon black, such as an aziridine group, within a molecule;
- ② polymer graft type carbon black obtained by reacting carbon black with a block or graft type polymer composed of a polymer segment of polystyrene or the like having a reactive group reactive with carbon black, such as an aziridine group, within a molecule, and a polymer segment of polyacrylate or the like having no reactive group within a molecule;
- treated carbon black, such as the one whose surface is covered with the surfactant or resin of various kinds;
- so-called white carbons, such as hydrous silicic acid ($SiO_2 \cdot nH_2O$), hydrophilic silicic anhydride ($SiO_2$), hydrophobic silicic anhydride, metal salts of hydrous silicate including hydrous aluminium silicate, hydrous calcium silicate, etc., and composite of these silicic acids, as well as white carbon treated with treatment agents of various kinds, such as surfactants;
- super-microscopic calcium carbonate (synthetic product), super-microscopic calcium carbonate treated with fatty aced or polymer, modified clay, microscopic particles of zinc oxide, microscopic particles of titanium oxide, microscopic particles of metal, microscopic particles of meatal complex, microscopic particles of polymer; etc.

One member or a mixture of two or more members selected from these example microscopic particles can be used effectively. Of all these examples, carbon black, polymer graft type carbon black which is in effect carbon black treated with a polymer, hydrous silicic acid, and metal salts of hydrous silicic acid are more preferable than the others.

The polymer graft type carbon black has excellent dispersion stability in the monomer composition, and can be blended in the blended composition at a relatively high concentration. Suitable polymers to produce the polymer graft type carbon black are, for example, poly-ethyl acrylate and poly-butyl acrylate. It is preferable that these polymers have similar structure to the structure of the monomers mainly forming the monomer composition, for example, ethyl acrylate or butyl acrylate. The polymer graft type carbon black can be blended with the monomer composition while it is dispersed in a monomer mainly forming the monomer composition, or a monomer having a similar structure to the structure of such a monomer. In other words, the polymer graft type carbon black can be blended with the monomer composition in the state of a dispersion liquid. Alternatively, a dispersing liquid of the polymer graft type carbon black can be used as the blended composition.

Hydrous silicic acid, metal salts of hydrous silicic acid, and a composite thereof have excellent dispersion stability in the monomer composition, and therefore, can be blended in the blended composition at a relatively high concentration. Accordingly, it has become possible to obtain elastomer with particularly noticeable reinforcement effect by polymerizing the blended composition in which the silicic acid compounds are blended.

An amount of the microscopic particles contained in the blended composition, that is, an amount of the microscopic particles blended with the monomer composition is not especially limited, and can be set arbitrarily depending on the chemical make-up of the monomer composition, kinds of the microscopic particles, a combination of the monomer composition and microscopic particles, dispersion stability, allowable viscosity to handle the blended composition, desired physical properties of the resulting elastomer, etc. An amount of the blended microscopic particles is preferably in a range between 5 parts by weight (5 phr (parts per hundred parts of rubber)) and 200 parts by weight (200 phr) with respect to 100 parts by weight of the monomer composition. A range between 10 parts by weight and 100 parts by weight is more preferable and a range between 10 parts by weight and 60 parts by weight is most preferable. Conventional elastomer (crosslinked rubber) is produced through the kneading step of kneading a filler or the like with the crude rubber, whereas elastomer of the present invention is produced by polymerizing and crosslinking the monomer composition in the presence of the microscopic powders. Therefore, the adhesion strength between the polymer (matrix) and microscopic particles in the elastomer of the present invention is greater than the adhesion strength between the crude rubber and filler in the conventional elastomer. Thus, since the reinforcement effect of the microscopic particles per unit weight is greater than that of the filler, the producing process of the present invention makes it possible to obtain elastomer having excellent physical properties using a relatively small amount of blended microscopic particles.

A method of blending (adding) and dispersing the microscopic particles to/in the monomer composition is not especially limited. For example, the blended composition can be readily obtained by dispersing the microscopic particles into a liquid of monomer composition using a paint shaker, a beads mill, a sand grind mill, a 2-roll mill, or the like. In case that a dispersion liquid of the polymer graft type carbon black or a silicic compound is used as the microscopic particles, these compounds can be readily dispersed in the monomer composition by a relatively simple method using a mixer or the like because of their excellent dispersion stability.

When the microscopic particles are blended in the monomer composition, a known dispersion assisting agent can be added to the monomer composition optionally in an adequate manner to control the condensation or precipitation of the microscopic particles. When the microscopic particles are dispersed in the monomer composition, a thickener assisting agent, such as metal oxides, including hydrophilic silicic anhydride, hydrophobic silicic anhydride, magnesium oxide, and zinc oxide, can be added to the monomer composition optionally in an adequate manner to control the condensation or precipitation of the microscopic particles by increasing the viscosity of the resulting blended composition. The microscopic particles may be dispersed in the blended composition or reside therein in the form of sol or colloid.

In the producing process of the present invention, the blended composition is produced by letting a liquid monomer composition contain the microscopic particles. Thus, far less energy and time are demanded to obtain the blended composition compared with the conventional producing process including the kneading step of kneading the crude rubber with a filler or the like. In short, according to the producing process of the present invention, the blended composition can be obtained with far less energy and time than those spent in the conventional kneading step.

The elastomer of the present invention is obtained by polymerizing the above-arranged monomer composition or blended composition. A polymerizing method is not especially limited, and for example, known polymerizing methods, such as polymerization by heating, by irradiation of activation energy rays, such as UV rays and electron beams, with the use of a radical polymerization initiator, etc. are available. Also, various known reaction patterns, such as bulk polymerization, suspension polymerization, emulsion polymerization, and dispersion polymerization, can be adopted as the pattern of the polymerization reaction. Thus, the resulting elastomer can be obtained in various forms including a sheet, particles (beads), powder, microscopic particles, etc. depending on the pattern of the polymerization reaction. Of all the above patterns, the bulk polymerization by adding a radical polymerization initiator to the monomer composition or blended composition is particularly preferable, because the producing procedure is the simplest and the elastomer can be produced at low costs. A suitable pattern to employ the bulk polymerization for the industrial use, that is, a suitable molding method or coating method are: cast molding, press molding, injection molding, RIM (Reactive Injection Molding), extrusion molding, layering, spray coating, etc.

Examples of the radical polymerization initiator include:

organic peroxides, such as benzoyl peroxide, methylethyl ketone peroxide, and t-amylperoxy-2-ethyl hexanoate;

organic azo compounds, such as 2,2'-azobis isobutylonitrile;

benzophenone, acetophenones, acylphosphineoxides; etc.

An amount of added radical polymerization initiator is not especially limited. Also, a polymerization promoter may be used in addition to the radical polymerization initiator. Examples of the polymerization promoter are:

organic metal salts, such as cobalt octenate and zinc stearate;

aromatic tertiary amines, such as dimethyl aniline;

triphenylphosphine; etc.

Further, a polymerization conditioner (so-called polymerization inhibitor), a photosensitizer, etc. can be used in addition to the radical polymerization initiator. Examples of the polymerization conditioner are: benzoquinone, paramethoxy phenol, hydroquinone, etc. When the polymerization promoter, polymerization conditioner, photosensitizer, etc. are used, an added amount of each is not especially limited.

The reaction conditions, such as the reaction pressure, reaction temperature, and reaction time in the polymerization reaction, are not especially limited, and can be set arbitrarily to complete the polymerization reaction. For example, the reaction conditions can be set depending on the chemical make-up of the monomer composition, whether or not any of water, the solubilizing agent, and synthetic resin is added, a polymerization method, a pattern of the polymerization reaction, whether or not any adduct is added, etc. An average molecular weight of the resulting elastomer is not especially limited, either.

When the above-arranged monomer composition or blended composition is polymerized, adducts of various kinds can be optionally added to the same. When the adduct is added to the monomer composition or blended composition, the adduct can be readily blended with the resulting elastomer.

In other words, it is difficult to blend the adduct with the conventional crosslinked elastomer, for example, acrylic rubber, because of its high viscosity, or the kneading step demanding quite a large amount of energy is indispensable to do so. In contrast, in case of the above-arranged monomer composition, since the monomer composition is a low viscous product, the adduct only has to be added to the monomer composition and stirred. Thus, the adduct can be readily blended with the elastomer in a simple manner.

Examples of the adduct include, but not limited to:

fillers, such as carbon black, calcium carbonate, aluminium hydroxide, talc, and clay;

thickeners, such as zinc oxide, magnesium oxide, and polyisocyanate compounds;

reinforcing materials, such as glass fibers;

plasticizers, such as aromatic oil;

antioxidant;

coloring agent, such as pigments;

mold release agents;

pigment dispersion agent; etc.

An amount of added adduct is not especially limited.

For example, when a thickener is added to the monomer composition or blended composition containing the vinyl-group-containing polymer or synthetic resin, the monomer composition or blended composition shows the thickening effect accruing from adding the thickener. In other words, adequate viscosity can be conferred to the monomer composition or blended composition by adjusting the viscosity by exploiting the thickening effect. Consequently, it has become possible to further improve the miscibility of the monomer composition or blended composition and the adducts, such as the filler, reinforcing material, and coloring agent, and the dispersion stability of the adducts. In addition, the handling and molding properties, workability of the monomer composition or blended composition can be further improved.

As has been explained, according to the process of the present invention, the blended composition is produced first by letting the monomer composition contain the microscopic particles, and then the resulting blended composition is polymerized. In other words, elastomer is produced by polymerizing the monomer composition, namely, the blended composition, in the presence of the microscopic particles. Thus, the adhesion strength of the polymer (matrix) and microscopic particles in the elastomer obtained by the above process is larger than the adhesion strength of the crude rubber and filler in the conventional elastomer (crosslinked rubber). Hence, the reinforcement effect of the microscopic particles per unit weight is larger than the reinforcement effect of the filler. Therefore, the reinforcement effect accruing from blending the microscopic particles is noticeably acknowledged in the resulting elastomer. For example, the tensile break strength can be significantly improved without substantially reducing the tensile break elongation. Also, according to the above process, the blended composition is produced by letting the monomer composition contain the microscopic particles. Thus, far less energy and time are demanded to obtain the blended composition compared with the conventional producing process including the kneading step of kneading the crude rubber with the filler. In other words, according to the producing process of the present invention, the blended composition can be obtained with far less energy and time than those spent in the conventional kneading step.

Consequently, inexpensive elastomer having excellent physical properties, such as small creep (low creep) in compression set, tensile elongation set, etc. and excellent mechanical strength, such as tensile break strength and tensile break elongation, can be produced at a high-level productivity in a simple procedure omitting the post-crosslinking step while saving energy and time spent in the kneading step.

Also, as has been explained, the producing process of the elastomer of the present invention is a process of obtaining a monomer mixture containing a metal salt monomer first by reacting a metal compound with a carboxyl-group-containing vinyl monomer in the presence of the selection monomer, then ultimately producing a monomer composition out of the resulting monomer mixture without separating the metal salt monomer from the monomer mixture, and polymerizing the resulting monomer composition.

According to the above process, since the monomer mixture containing the metal salt monomer is obtained, the solubility of the metal salt monomer is improved, and the concentration of the metal salt monomer in the resulting monomer composition can be increased to a higher level than in the conventional process without using, for example, a solubilizing agent. Thus, compared with the conventional process, a larger amount of metal salts can be introduced to the polymer matrix of the resulting elastomer in a stable manner by polymerizing the monomer composition. That is, the ion crosslinking degree of the resulting elastomer can be increased satisfactorily. Thus, it has become possible to produce elastomer having excellent mechanical strength, such as tensile strength and tear strength, and physical properties, such as heat resistance, oil resistance, weather resistance, and transparency.

Also, since the monomer composition includes the polyfunctional vinyl monomer and/or vinyl-group-containing polymer in addition to the metal salt monomer, the crosslinked elastomer can have smaller (lower) creep in the compression set, tensile elongation set, etc. while maintaining the satisfactory performance (physical properties) rendered to the conventional acrylic-based ion crosslinked elastomer.

In case that the monomer composition includes both the metal salt monomer and vinyl-group-containing polymer, since the vinyl-group-containing polymer has at least two double bonds (vinyl groups), the vinyl-group-containing polymer copolymerizes with alkyl (meth)acrylate or metal salt monomer, and optionally with the monofunctional vinyl monomer and/or polyfunctional vinyl monomer, thereby forming the crosslinking structure. Consequently, homogeneous and transparent elastomer can be obtained. In case that a polymer without the double bond (vinyl group) is used instead of the vinyl-group-containing polymer, the polymer can not copolymerize with the above elements, and therefore, can not form the crosslinking structure. Thus, the resulting elastomer is neither homogeneous nor transparent, and inferior in performance (physical properties).

Further, in case that the monomer composition includes both the metal salt monomer and vinyl-group-containing polymer, not only adequate viscosity can be conferred to the monomer composition, but also the viscosity can be adjusted by exploiting the thickening effect accruing from, for example, adding a thickener. Thus, it has become possible to improve the miscibility or dispersion stability of adducts of various kinds optionally added to the monomer composition, while improving the handling and molding properties, workability, productivity, etc. when the monomer composition is polymerized. Moreover, in case that the monomer composition includes the polyfunctional vinyl monomer and vinyl-group-containing polymer, the mechanical strength and physical properties, such as creep, can be balanced particularly in a satisfactory manner.

Further, according to the above process, the elastomer can be produced in the so-called "1 pot" reaction from the materials of the monomer composition (monomers of various kinds). In other words, the above process can omit the post-crosslinking step. Thus, inexpensive elastomer can be produced in a simple procedure at a high-level productivity.

Consequently, it has become possible to produce elastomer having excellent physical properties, such as small creep in the compression set, tensile elongation set, etc., and excellent mechanical strength. Also, a process of producing such elastomer in a simple procedure inexpensively at a high-level productivity can be provided.

The elastomer of the present invention has general versatility, and can be used suitably in diversified fields. For example, the elastomer of the present invention can be suitably used as:

- sealing materials, roll materials, sealant (packing materials), hose materials for automobiles, civil construction, marine vessels, etc.;
- article materials based on polyolefin or urethane, such as coating armor materials or sound-proof articles produced by RIM (Reactive Injection Molding), vibration-proof articles, articles made into one entity with FRP (Fiber Reinforced Plastic);
- water-proof lining, such as water-proof coating film;
- inner components of a copying machine, such as a charging roller, a transfer roller, a developing roller, or high-performance rubber as photosensitive rubber used as a flexible printing plate or photoresist, conductive rubber, oil-absorption rubber, water-absorption rubber; etc.

The elastomer of the present invention can exhibit excellent performance (physical properties) in each of the above use, and when used as a molding material, the productivity of the articles can be improved.

In the following, the present invention will be explained in detail by way of Examples and Comparative Examples. However, the present invention is not limited to Examples and Comparative Examples below. In Examples and Comparative Examples, "part(s)" means "part(s) by weight" unless otherwise specified.

The mechanical strength and physical properties of the elastomer obtained in Examples and Comparative Examples, that is, type A durometer hardness, tensile elastic modulus, tensile break strength, tensile break elongation, tensile elongation set, and compression set are measured by testing methods in accordance with JIS K 6301.

To be more specific, the tensile elastic modulus, tensile break strength, and tensile break elongation are measured with 3 mm-thick dumbbell specimen No. 2 at a tensile rate of 500 mm/min. In case of the tensile elastic modulus, a value at 100% elongation is read. The tensile elongation set is measured using the 3 mm-thick dumbbell specimen No. 2 at a tensile rate such that half the length of the tensile break elongation is tensed over 15 seconds. In the measurement, the specimen is tensed at the above tensile rate for 10 minutes, and a distance between bench marks is read after 10 minutes since the load is removed. In case of the measurement of the compression set, a circular cylinder specimen having a diameter of 20 mm and a thickness of 12 mm is used. Here, the specimen is compressed at a compression ratio of 25% for 70 hours at 90° C., and a thickness is measured after 30 minutes since the load is removed and the gradual cooling is started.

(EXAMPLE 1)

Here, (meth)acrylic syrup including a polymer based on (meth)acrylate is synthesized as the vinyl-group-containing polymer. To be more specific, 177 parts of methyl methacrylate and 22.8 parts of methacrylic acid are charged to a reaction vessel of 500 ml equipped with a stirrer, a cooling pipe, a thermometer, and a gas conduit, after which air inside the reaction vessel is displaced by a nitrogen gas. Then, 0.1 part of 2,2'-azobis isobutylonitrile (radical polymerization initiator) and 0.28 part of n-dodecyl mercaptan (polymerization conditioner) are added to the resulting mixture with stirring, after which the temperature inside the reaction vessel is raised to 80° C. under a nitrogen gas flow, and the resulting mixture is let undergo polymerization at 80° C.

When the polymerization ratio reaches about 40%, that is, when an amount of the non-volatile portion (copolymer of methyl methacrylate and methacrylic acid, namely, polymer A) reaches 40 wt % on the basis of a total weight of the reaction solution, 37.6 parts of glycidyl methacrylate, 0.15 part of benzyl triphenyl phosphonium chloride (catalyst), and 0.02 part of hydroquinone (polymerization inhibitor) are added to the reaction solution and mixed with the same, after which the reaction vessel is cooled rapidly.

After the reaction vessel is cooled rapidly, the temperature inside the reaction vessel is raised to 100° C. while the reaction solution is stirred under air atmosphere, and the resulting mixture is let undergo reaction for 23 hours at 100° C. In other words, vinyl groups are introduced to the side chains of the polymer A by reacting the polymer A with glycidyl methacrylate. Consequently, a mixture including a copolymer of methyl methacrylate and methacrylic acid having at least two vinyl groups at the side chains, unreacted methyl methacrylate, and unreacted methacrylic acid, that is, methacrylic syrup containing a polymer based on methacrylate (hereinafter, referred to as syrup A), is obtained.

The syrup A is transparent and includes a non-volatile portion of 45.1 wt % on the basis of a total weight of the syrup A. Also, the acid value of the polymer based on methacrylate contained in the syrup A is 21.0 mgKOH/g. Since the difference between the acid value of the polymer A and the acid value of the polymer based on methacrylate is 41.7 mgKOH/g, it is understood that 66.5% of carboxyl groups contained in the polymer A are replaced with the vinyl groups. The syrup A (monomer composition) produced in the above manner is used to prepare the blended composition.

Meanwhile, a dispersion liquid of ethyl acrylate containing polymer graft type carbon black as the microscopic particles is synthesized. To be more specific, 75 parts of poly(butyl acrylate) macromer (AB-6 of Toagosei Chemical Industry Co., Ltd.), 15 parts of styrene, 10 parts of isopropenyl oxazoline, and 3 parts of 2,2'-azobis isobutylonitrile (radical polymerization initiator) are dissolved into 100 parts of toluene, whereby a monomer mixture is obtained.

Then, 50 parts of toluene is charged to a flask equipped with a stirrer, a cooling pipe, a thermometer, a dropping funnel, and a gas conduit, after which air inside the flask is displaced by a nitrogen gas. In addition, the above monomer mixture is charged to the dropping funnel. Then, the temperature inside the flask is raised to 80° C. under a nitrogen gas flow with the stirring of toluene. Subsequently, the monomer mixture is dropped to toluene over three hours while toluene is stirred at 80° C. When the dropping ends, the mixture inside the flask is let undergo polymerization for two hours at 80° C. with stirring under a nitrogen gas flow, after which the temperature inside the flask is raised to 100° C. so as to mature the mixture at 100° C.

When the reaction ends, the flask is cooled and the contents is taken out, whereby a toluene solution of a reactive polymer, having 39.8 wt % of a non-volatile portion and oxazoline groups as reactive groups, is obtained. After toluene is distilled out from the solution under reduced pressure, the solution is dried with a decompression dryer, whereby a reactive polymer having 99.7 wt % of a non-volatile portion is obtained. Then, a polymer solution is obtained by dissolving 8 parts of the above reactive polymer into 52 parts of ethyl acrylate.

Subsequently, 60 parts of the above polymer solution is charged to a separable flask equipped with a stirrer, a cooling pipe, and a thermometer, after which 40 parts of carbon black (SB250, PH3.1 of Degussa Co., Ltd., having an average primary particle size of 56 nm) is added and dispersed inside the flask. Further, after 700 parts of zirconia beads are charged to the flask, the reaction solution is let undergo graft reaction for one hour at 100° C. with stirring at 700 rpm.

When the reaction ends, the reaction product is separated from the zirconia beads, whereby a dispersion liquid of ethyl acrylate (hereinafter, referred to as dispersion liquid B) containing polymer graft type carbon black (hereinafter referred to simply as graft type carbon) as the microscopic particles, in which a polymer mainly composed of poly-butyl acrylate is graft-polymerized, is obtained.

An amount of the non-volatile portion of the dispersion liquid B is 49.1 wt %. The dispersion liquid B is relatively low viscous, and remains in a stable state without having the graft type carbon precipitated nor coagulated after a month since the preparation. The dispersion liquid B (that is, a mixture of the monomer composition and microscopic particles) prepared in the above manner is used to prepare the blended composition in the manner described below.

The blended composition is prepared using the syrup A and dispersion liquid B prepared in the above manners. To be more specific, 15 parts of syrup A, 50 parts of dispersion liquid B, 34.5 parts of ethyl acrylate, and 16.9 parts of butyl acrylate are mixed with one another with stirring, whereby the blended composition of the present invention is prepared. Thus, an amount of the monomer composition contained in the blended mixture is 91.9 parts, and an amount of the graft type carbon contained therein is 24.4 parts (26.6 phr). The chemical-make up of the monomer composition is: 6.8 parts of the polymer based on methacrylate (vinyl-group-containing polymer) as the polyfunctional compound, and as the monofunctional compounds, 60.0 parts of ethyl acrylate, 16.9 parts of butyl acrylate, and 8.2 parts of methyl methacrylate. The blended composition is relatively low viscous, and remains in a stable state without having the graft type carbon precipitated nor coagulated after one week since the preparation.

Then, 0.8 part of a curing agent (328E, organic peroxide of Kayaku Akzo Corporation) as the radical polymerization initiator, and 0.3 part of a mineral spirit solution of cobalt octenate (containing 8 wt % of cobalt) as a polymerization promoter are added to 100 parts of the above blended composition and blended with the same. Then, the resulting mixture is filled in a cell composed of two glass plates and a gasket made of silicone resin, and let undergo polymerization for seven hours at 55° C., and for further two hours at 120° C., whereby the elastomer of the present invention is obtained.

The physical properties of the resulting elastomer are measured in the above manners. Then, the type A durometer hardness is 82HDA, tensile elastic modulus is 38 kgf/cm$^2$, tensile break strength is 80 kgf/cm$^2$, tensile break elongation is 350%, tensile elongation set is 0.8%, and compression set is 8.0%, which are set forth in Table 1 below.

(EXAMPLE 2)

Here, 34.5 parts of ethyl acrylate as alkyl (meth)acrylate, 16.9 parts of butyl acrylate, and 15 parts of the syrup A obtained in Example 1 are charged to a reaction vessel of 200 ml equipped with a stirrer, a cooling pipe, and a thermometer, so as to be dissolved into one another. Then, 2.6 parts of zinc oxide as the polyvalent metal compound is added to the reaction vessel and mixed with the reaction solution for 30 minutes with stirring. Meanwhile, 2.2 parts of acrylic acid and 2.7 parts of methacrylic acid as the carboxyl-group-containing vinyl monomers, and 0.5 part of water are mixed with one another, whereby a mixture liquid is prepared. A mole ratio of the polyvalent metal compound (zinc oxide), carboxyl-group-containing vinyl monomer (a total of acrylic acid and methacrylic acid), and water is 1.0:2.08:1.0.

Then, the above mixture liquid is added to the mixture in the reaction vessel with stirring and let undergo reaction for one hour at 70° C. The resulting reaction mixture (monomer composition) is homogeneous and transparent, and remains as such after it is cooled to room temperature. Further, the reaction mixture remains homogeneous and transparent after it is allowed to stand for one week at room temperature. Thus, it is confirmed that the entire amount of added zinc oxide is replaced with double salts of acrylic acid and methacrylic acid (zinc salts of acrylic acid and methacrylic acid, hereinafter, referred to as zinc double salts). An amount of produced zinc double salts as the metal salt monomer is 6.4 parts.

A blended composition is prepared using the reaction mixture prepared in the above manner and the dispersion liquid B obtained in Example 1. To be more specific, the reaction mixture is mixed with 50 parts of the dispersion liquid B with stirring, whereby the blended composition of the present invention is prepared. Thus, an amount of the monomer composition contained in the blended composition is 99.9 parts, and an amount of the graft type carbon contained therein is 24.4 parts (24.4 phr). The chemical-make up of the monomer composition is: 6.8 parts of the polymer based on methacrylate (vinyl-group-containing polymer) as the polyfunctional compound, 6.4 parts of zinc double salts (metal salt monomer), 60.0 parts of ethyl acrylate, 16.9 parts of butyl acrylate, 8.2 parts of methyl methacrylate, and 1.1 part of (meth)acrylic acid as the monomer compounds, and 0.5 part of water. The blended composition is relatively low viscous, and remains in a stable state without having the graft type carbon precipitated nor coagulated after one week since the preparation.

Then, the elastomer of the present invention is obtained by carrying out the reaction and manipulation in the same manner as Example 1 using the above blended composition. The physical properties of the resulting elastomer are measured in the above manners, and the results of which are set forth in Table 1 below.

(EXAMPLE 3)

A reaction mixture (monomer composition) is obtained by carrying out the reaction and manipulation in the same manner as Example 2 except that an amount of charged ethyl acrylate is increased to 60.0 parts and an amount of charged butyl acrylate is increased to 25.0 parts. The resulting reaction mixture is homogeneous and transparent, and remains as such after it is cooled to room temperature. Further, the reaction mixture remains homogeneous and transparent after it is allowed to stand for one week at room temperature. Thus, it is confirmed that the entire amount of added zinc oxide is replaced with zinc double salts. An amount of produced zinc double salts is 6.4 parts.

Then, 15 parts of carbon black (Sheathed N, LI-HAF of Tokai Carbon Co., Ltd., having an average primary particle size of 29 nm) as the microscopic particles is added to 108 parts of the reaction mixture prepared in the above manner, and stirred and dispersed for 30 minutes using a paint shaker filled with glass beads.

When the dispersion ends, the glass beads are separated, whereby the blended composition of the present invention is prepared. Thus, an amount of the monomer composition contained in the blended composition is 108 parts, and an amount of carbon black contained therein is 15.0 parts (13.9 phr). The chemical make-up of the monomer composition is: 6.8 parts of the polymer based on methacrylate (vinyl-group-containing polymer) as the polyfunctional compound, 6.4 parts of zinc double salts (metal salt monomer), 60.0 parts of ethyl acrylate, 25.0 parts of butyl acrylate, 8.2 parts of methyl methacrylate, and 1.1 part of (meth)acrylic acid as the monofunctional compounds, and 0.5 part of water. The blended composition has thixotropic property, but shows the fluidity and maintains a stable dispersion state.

Then, the elastomer of the present invention is obtained by carrying out the reaction and manipulation in the same manner as Example 1 using the above blended composition. The physical properties of the resulting elastomer are measured in the above manners, and the results of which are set forth in Table 1 below.

(EXAMPLE 4)

The reaction mixture (monomer composition) is obtained by carrying out the reaction and manipulation in the same manner as Example 3. Then, 20 parts (20 phr) of hydrous silicic acid (Tokuseal U of Kabushiki Kaisha Tokuyama, having an average primary particle size of 15 nm–18 nm) as the microscopic particles is added to 100 parts of the reaction mixture and dispersed therein, whereby the blended composition of the present invention is prepared. The blended composition has an outward appearance like clouding sol, but it is relatively low viscous and maintains a stable dispersion state.

Then, the elastomer of the present invention is obtained by carrying out the reaction and manipulation in the same manner as Example 1 using the above blended composition. The physical properties of the resulting elastomer are measured in the above manners, and the results of which are set forth in Table 1 below.

(EXAMPLE 5)

The reaction mixture (monomer composition) is obtained by carrying out the reaction and manipulation in the same manner as Example 3. Then, 30 parts (30 phr) of a composite of hydrous silicic acid and calcium carbonate (Solex CM of Kabushiki Kaisha Tokuyama, having an average primary particle size of 15 nm–18 nm and containing 58.5 wt % of hydrous silicic acid) as the microscopic particles is added to 100 parts of the reaction mixture and dispersed therein, whereby the blended composition of the present invention is prepared. The blended composition is white and relatively low viscous, and maintains a stable dispersion state.

Then, the elastomer of the present invention is obtained by carrying out the reaction and manipulation in the same manner as Example 1 using the above blended composition. The physical properties of the resulting elastomer are measured in the above manners, and the results of which are set forth in Table 1 below.

(Comparative Example 1)

Here, 60 parts of ethyl acrylate, 25 parts of butyl acrylate, and 15 parts of the syrup A are blended with one another with stirring, whereby a comparative blended composition is obtained. Thus, the comparative blended composition does not contain the microscopic particles.

Then, comparative elastomer is obtained by carrying out the reaction and manipulation in the same manner as Example 1 using the above comparative blended composition. The physical properties of the resulting comparative elastomer are measured in the above manners. Then, it is revealed that the comparative elastomer is inferior to the elastomer obtained in Example 1 particularly in tensile break strength. The results of the measurement are set forth in Table 1 below.

(Comparative Example 2)

The reaction mixture obtained by carrying out the reaction and manipulation in the same manner as Example 3 is used as a comparative blended composition. Thus, the comparative blended composition does not contain the microscopic particles.

Then, comparative elastomer is obtained by carrying out the reaction and manipulation in the same manner as Example 1 using the above comparative blended composition. The physical properties of the resulting comparative elastomer are measured in the above manners. Then, it is revealed that the comparative elastomer is inferior to each elastomer obtained in Examples 2–5 particularly in tensile break strength. The results of the measurement are set forth in Table 1 below.

(Comparative Example 3)

The reaction mixture is obtained by carrying out the reaction and manipulation in the same manner as Example 3. Then, 50 parts (50 phr) of aluminium hydroxide (Higilite H-320 of Showa Denko K.K., having an average particle size of 800 nm measured by the microtrack particle size distribution method) is added to 100 parts of the resulting reaction mixture, and dispersed therein for 30 minutes with stirring using a homomixer. Then, to control the precipitation of aluminium hydroxide, 3.1 parts of hydrophilic silicic anhydride (Aerosil 200 of Nippon Aerosil Co., Ltd.) as a thickener is added and again dispersed in the reaction mixture for 30 minutes with stirring using the homomixer, whereby a comparative blended composition is prepared.

Then, comparative elastomer is obtained by carrying out the reaction and manipulation in the same manner as Example 1 using the above comparative blended composition. The physical properties of the resulting comparative elastomer are measured in the above manners. Then, it is revealed that the comparative elastomer is inferior to each elastomer obtained in Examples 2–5 particularly in tensile break strength. The results of the measurement are set forth in Table 1 below.

(Comparative Example 4)

A reaction mixture is obtained by carrying out the reaction and manipulation in the same manner as Example 3. Then, 100 parts (100 phr) of heavy calcium carbonate (R Bicarbon of Maruo Calcium Kabushiki Kaisha, having an average particle size of 7400 nm measured by the specific area method) is added to 100 parts of the resulting reaction mixture, and dispersed therein for 30 minutes with stirring by a homomixer, whereby a comparative blended mixture is obtained.

Then, comparative elastomer is obtained by carrying out the reaction and manipulation in the same manner as Example 1 using the above comparative blended composition. The physical properties of the resulting comparative elastomer are measured in the above manners. Then, it is revealed that the comparative elastomer is inferior to each elastomer obtained in Examples 2–5 particularly in tensile break strength and tensile break elongation. The results of the measurement are set forth in Table 1 below.

ance of the mechanical strength and the physical strength, such as creep, is not satisfactory.

In addition, it is obvious from the results of Examples 1–5 that, when the producing process of the present invention is adopted, the microscopic particles and adducts of various kinds can be readily mixed with the monomer composition and the elastomer can be produced in a simple procedure omitting the post-crosslinking step, or a so-called "1 pot" reaction.

TABLE 1

| | POLYFUNCTIONAL COMPOUND | | MICROSCOPIC PARTICLES | | PHYSICAL PROPERTY TEST RESULTS | | |
|---|---|---|---|---|---|---|---|
| EXAMPLE/ COMPARATIVE EXAMPLE | VINYL-GROUP CONTAINING- POLYMER | METAL SALT MONOMER | KIND | AVE. PRIMARY PARTICLE SIZE (nm) ADDED AMOUNT (phr) | DUROMETER HARDNESS (HDA) | TENSILE ELASTIC MODULUS (kgf/cm$^2$) | TENSILE BREAK STRENGTH (kgf/cm$^2$) |
| 1 | ○ | X | G-TYPE CARBON | 56 26.6 | 82 | 38 | 80 |
| 2 | ○ | ○ | G-TYPE CARBON | 56 24.4 | 88 | 90 | 197 |
| 3 | ○ | ○ | G-TYPE CARBON | 29 13.9 | 82 | 64 | 160 |
| 4 | ○ | ○ | H-SILICIC ACID | 15–18 20 | 86 | 95 | 194 |
| 5 | ○ | ○ | H-SILICIC COMPOSITE | 15–18 30 | 90 | 129 | 200 |
| 1 | ○ | X | X | — | 35 | 6 | 25 |
| 2 | ○ | ○ | X | — | 74 | 24 | 99 |
| 3 | ○ | ○ | ALUMINIUM HYDROXIDE | 8000 50 | 85 | 59 | 126 |
| 4 | ○ | ○ | H-CALCIUM CARBONATE | 7400 100 | 90 | 56 | 110 |

| | PHYSICAL PROPERTY TEST RESULTS | | |
|---|---|---|---|
| EXAMPLE/ COMPARATIVE EXAMPLE | TENSILE BREAK ELONGA- TION (%) | TENSILE ELONGA- TION SET (%) | COMPRESSION SET (%) |
| 1 | 350 | 0.8 | 8 |
| 2 | 310 | 3.7 | 35 |
| 3 | 400 | 3.8 | 36 |
| 4 | 320 | 3.8 | 38 |
| 5 | 300 | 4.3 | 40 |
| 1 | 390 | 0.5 | 2 |
| 2 | 550 | 4.1 | 46 |
| 3 | 340 | 4.1 | 47 |
| 4 | 220 | — | — |

G-TYPE CARBON: GRAFT TYPE CARBON H-SILICIC ACID: HYDROUS SILICIC ACID H-SILICIC COMPOSITE: COMPOSITE OF HYDROUS SILICIC ACID
H-CALCIUM CARBONATE: HEAVY CALCIUM CARBONATE

It is obvious from the results of Examples 1–5 that each elastomer obtained by the producing process of the present invention shows the reinforcement effect accruing from blending the microscopic particles noticeably, and has small creep (low creep) in compression set, tensile elongation set, etc. while having excellent mechanical strength, such as tensile elastic modulus, tensile break strength, and tensile break elongation. In other words, it is revealed that the mechanical strength and the physical properties, such as creep, of above each elastomer are improved in a well balanced manner by exploiting the enforcement effect accruing from blending the microscopic particles. In contrast, it is obvious from the results of Comparative Examples 1–4 that each comparative elastomer is inferior to each elastomer of the present invention in mechanical strength, and the bal- (EXAMPLE 6)

Here, 92.6 g of ethyl acrylate as alkyl (meth)acrylate and 2.8 g of trimethylol propane trimethacrylate as the polyfunctional vinyl monomer are charged to a reaction vessel of 200 ml equipped with a stirrer, a cooling pipe, and a thermometer. Then, 1.2 g of zinc oxide as the metal compound is added to the mixture in the reaction vessel and mixed with the same with stirring for 30 minutes. Meanwhile, 1.0 g of acrylic acid and 1.25 g of methacrylic acid as the carboxyl-group-containing vinyl monomer, and 0.25 g of water are mixed with one another, whereby a mixture liquid is prepared. A mole ratio of the metal compound (zinc oxide), carboxyl-group-containing vinyl monomer (a total of acrylic acid and methacrylic acid) and water is 1.0:2.08:1.0.

Then, the mixture liquid is added to the mixture in the reaction vessel with stirring, after which the reaction mixture is let undergo reaction for one hour at 70° C. The resulting reaction mixture (monomer mixture) is homogeneous and transparent, and remains as such after it is cooled to room temperature. Further, the reaction mixture remains homogeneous and transparent after it is allowed to stand for one week at room temperature. Thus, it is confirmed that the entire amount of added zinc oxide is replaced with double salts of acrylic acid and methacrylic acid (zinc salts of acrylic acid and methacylric acid, which are referred to as zinc double salts hereinafter). An amount of produced zinc double salts as the metal salt monomer is 3.15 g. The monomer composition of the present invention is obtained in this manner.

Then, 0.5 part of a 55 wt % dimethylphthalate solution of methyl ethyl ketone peroxide as the radical polymerization initiator and 0.5 part of a mineral spirit solution (containing 8 wt % of cobalt) of cobalt octenate as the polymerization promoter are added to 100 parts of the monomer composition and mixed with the same. The resulting mixture is filled in a cell composed with two glass plates and a gasket made of silicone resin, and let undergo polymerization for seven hours at 65° C., and for further two hours at 120° C., whereby the elastomer of the present invention is obtained.

The resulting elastomer has a transparent outward appearance. The physical properties of the elastomer are measured in the above manners. Then, the type A durometer hardness is 45HDA, tensile elastic modulus is 6.2 kgf/cm$^2$, tensile break strength is 30.3 kgf/cm$^2$, tensile break elongation is 440%, tensile elongation set is 1.6%, and compression set is 28.4%, which are set forth in Table 2 below.

(EXAMPLE 7)

A reaction mixture is obtained by carrying out the reaction and manipulation in the same manner as Example 6 except that an amount of added zinc oxide, an amount of used acrylic acid, an amount of used methacrylic acid, an amount of added water are increased (doubled) to 2.4 g, 2.0 g, 2.5 g, and 0.5 g, respectively. Then, it is confirmed that the entire amount of added zinc oxide is replaced with the zinc double salts by confirming that the resulting reaction mixture remains homogeneous and transparent in the same manner as Example 6. An amount of produced zinc double salts is 6.3 g. The monomer composition of the present invention is obtained in this manner.

The elastomer of the present invention is obtained by carrying out the reaction and manipulation in the same manner as Example 6 using the above monomer composition. The resulting elastomer has a transparent outward appearance. The physical properties of the elastomer are measured in the above manners, and the results of which are set forth in Table 2 below.

(EXAMPLE 8)

A reaction mixture is obtained by carrying out the reaction and manipulation in the same manner as Example 6 except that 1.3 g of diethylene glycol dimethacrylate is used as the polyfunctional vinyl monomer instead of trimethylol propane trimethacrylate, and that an amount of added zinc oxide, an amount of used acrylic acid, an amount of used methacrylic acid, an amount of added water are increased to 2.4 g, 2.0 g, 2.5 g, and 0.5 g, respectively. Then, it is confirmed that the entire amount of added zinc oxide is replaced with the zinc double salts by confirming that the resulting reaction mixture remains homogeneous and transparent in the same manner as Example 6. An amount of produced zinc double salts is 6.3 g. The monomer composition of the present invention is obtained in this manner.

The elastomer of the present invention is obtained by carrying out the reaction and manipulation in the same manner as Example 6 using the above monomer composition. The resulting elastomer has a transparent outward appearance. The physical properties of the elastomer are measured in the above manners, and the results of which are set forth in Table 2 below.

(EXAMPLE 9)

Here, 100 g of ethyl acrylate and 3.0 g of trimethylol propane trimethacrylate are charged to a reaction vessel of the same type as the one used in Example 6. Then, 1.1 g of magnesium oxide as the metal compound is added to the mixture in the reaction vessel and mixed with the same for 30 minutes with stirring. Meanwhile, 2.1 g of acrylic acid, 2.5 g of methacrylic acid, and 0.5 g of water are mixed with one another, whereby a mixture liquid is prepared. A mole ratio of the metal compound (magnesium oxide), carboxyl-group-containing vinyl monomer (a total of acrylic acid and methacrylic acid), and water is 1.0:2.1:1.0.

Then, the mixture liquid is added to the mixture in the reaction vessel with stirring, after which the reaction mixture is let undergo reaction for one hour at 70° C. The resulting reaction mixture (monomer mixture) is homogeneous and transparent, and remains as such after it is cooled to room temperature. Further, the reaction mixture remains homogeneous and transparent after it is allowed to stand for one week at room temperature. Thus, it is confirmed that the entire amount of added magnesium oxide is replaced with double salts of acrylic acid and methacrylic acid (magnesium salts of acrylic acid and methacylric acid, which are referred to as magnesium double salts hereinafter). An amount of produced magnesium double salts as the metal salt monomer is 5.0 g. The monomer composition of the present invention is obtained in this manner.

The elastomer of the present invention is obtained by carrying out the reaction and manipulation in the same manner as Example 6 using the above monomer composition. The resulting elastomer has a transparent outward appearance. The physical properties of the elastomer are measured in the above manners, and the results of which are set forth in Table 2 below.

(Comparative Example 5)

A comparative reaction mixture is obtained by carrying out the reaction and manipulation in the same manner as Example 7 except that trimethylol propane trimethacrylate as the polyfunctional vinyl monomer is not used. Then, it is confirmed that the entire amount of added zinc oxide is replaced with the zinc double salts by confirming that the resulting reaction mixture remains homogeneous and transparent in the same manner as Example 6. An amount of produced magnesium double salts is 6.3 g. A comparative monomer composition is obtained in this manner. In other words, a comparative monomer composition containing no polyfunctional vinyl monomer is obtained.

Then, 0.5 part of a 55 wt % dimethylphthalate solution of methyl ethyl ketone peroxide and 0.5 part of a mineral spirit solution (containing 8 wt % of cobalt) of cobalt octenate are added to 100 parts of the above comparative monomer composition and mixed with the same. The resulting mixture is filled in a cell of the same type as the one used in Example 6, and let undergo polymerization for seven hours at 45° C., and for further two hours at 120° C., whereby comparative elastomer is obtained.

The resulting comparative elastomer has a transparent outward appearance. The physical properties of the elastomer are measured in the above manners, and the result of which reveal that the comparative elastomer has excellent tensile break strength and tensile break elongation, but has poor tensile elongation set and compression set, that is, the comparative elastomer has large creep and poor rubber elasticity. The results of the measurement are set forth in Table 2 below.

(Comparative Example 6)

Here, 92.6 g of ethyl acrylate is mixed with 2.8 g of trimethylol propane trimethacrylate, whereby a comparative monomer composition is prepared. In other words, a comparative monomer composition containing no metal salt monomer is obtained.

Then, 0.5 part of a 55 wt % dimethylphthalate solution of methyl ethyl ketone peroxide and 0.5 part of a mineral spirit solution (containing 8 wt % of cobalt) of cobalt octenate are added to 100 parts of the above comparative monomer composition and mixed with the same. The resulting mixture is filled in a cell of the same type as the one used in Example 6, and let undergo polymerization for seven hours at 60° C., and for further two hours at 120° C., whereby comparative elastomer is obtained.

The resulting comparative elastomer has a transparent outward appearance. The physical properties of the elastomer are measured in the above manners, and the result of which reveal that the comparative elastomer has excellent tensile elongation set and compression set, but has poor tensile break strength. The results of the measurement are set forth in Table 2 below.

(Comparative Example 7)

Here, 92.6 g of ethyl acrylate is mixed with 1.3 g of diethylene glycol dimethacrylate, whereby a comparative monomer composition is prepared. In other words, a comparative monomer composition containing no metal salt monomer is obtained. Then, comparative elastomer is obtained by carrying out the reaction and manipulation in the same manner as Comparative Example 6 using the above comparative monomer composition.

The resulting comparative elastomer has a transparent outward appearance. The physical properties of the elastomer are measured in the above manners, and the result of which reveal that the comparative elastomer has excellent tensile elongation set and compression set, but poor tensile break strength. The results of the measurement are set forth in Table 2 below.

(EXAMPLE 10)

Here, 64.3 g of n-butyl acrylate and 27.6 g of methyl methacrylate as alkyl (meth)acrylate, and 1.6 g of a dimethacrylate compound of diethylene glycol diphthalate as the polyfunctional vinyl monomer are charged to a reaction vessel of 200 ml equipped with a stirrer, a cooling pipe, and a thermometer. Then, 0.8 g of zinc oxide is added to the mixture in the reaction vessel and mixed with the same for 30 minutes with stirring. Meanwhile, 5.6 g of 2-methacryloyl oxyethyl phthalic acid (NK ester CB-1 of Shinnakamura Kagaku Kabushiki Kaisha) as the carboxyl-group-containing vinyl monomer is mixed with 0.09 g of water, whereby a mixture liquid is prepared. A mole ratio of the metal compound (zinc oxide), carboxyl-group-containing vinyl monomer (2-methacryloyl oxyethyl phthalic acid), and water is 1.0:2.08:1.0.

Then, the mixture liquid is added to the mixture in the reaction vessel with stirring for one hour at 70° C. The resulting reaction mixture (monomer mixture) is homogeneous and transparent, and remains as such after it is cooled to room temperature. Further, the reaction mixture remains homogeneous and transparent after it is allowed to stand for one week at room temperature. Thus, it is confirmed that the entire amount of added zinc oxide is replaced with zinc salts of 2-methacryloyl oxyethyl phthalic acid. An amount of produced zinc salts as the metal salt monomer is 6.7 g. The monomer composition of the present invention is obtained in this manner.

The elastomer of the present invention is obtained by carrying out the reaction and manipulation in the same manner as Example 6 using the above monomer composition. The resulting elastomer has a transparent outward appearance. The physical properties of the elastomer are measured in the above manners, and the results of which are set forth in Table 2 below.

(Comparative Example 8)

A comparative reaction mixture is obtained by carrying out the reaction and manipulation in the same manner as Example 10 except that the dimethacrylate compound of diethylene glycol diphthalate as the polyfunctional vinyl monomer is not used. Then, it is confirmed that the entire amount of added zinc oxide is replaced with the zinc salts of 2-methacryloyl oxyethyl phthalic acid by confirming that the resulting reaction mixture remains homogeneous and transparent in the same manner as Example 10. An amount of produced zinc salts is 6.7 g. A comparative monomer composition is obtained in this manner. In other words, a comparative monomer composition containing no polyfunctional vinyl monomer is obtained.

Then, comparative elastomer is obtained by carrying out the reaction and manipulation in the same manner as Example 6. The resulting comparative elastomer has a transparent outward appearance. The physical properties of the comparative elastomer are measured in the above manners. Then, it is revealed that the comparative elastomer has excellent tensile break elongation, but poor tensile elongation set and compression set, that is, the comparative elastomer has large creep and poor rubber elasticity. The results of measurements are set forth in Table 2 below.

(Comparative Example 9)

Here, 64.3 g of n-butyl acrylate, 27.6 g of methyl methacrylate, and 1.6 g of a dimethacrylate compound of diethylene glycol diphthalate are mixed with one another, whereby a comparative monomer composition is prepared. In other words, a comparative monomer composition containing no metal salt monomer is obtained.

Then, comparative elastomer is obtained by carrying out the reaction and manipulation in the same manner as Example 6 using the above comparative monomer composition. The resulting comparative elastomer has a transparent outward appearance. The physical properties of the elastomer is measured in the above manners, and it is revealed that the comparative elastomer has excellent tensile elongation set and compression set, but poor tensile break strength. The results of the measurement are set forth in Table 2 below.

(EXAMPLE 11)

Here, 198 g of n-butyl methacrylate as alkyl (meth) acrylate and 2 g of methacrylic acid are charged to a reaction vessel of 500 ml equipped with a stirrer, a cooling pipe, a thermometer, and a nitrogen gas conduit, after which air inside the reaction vessel is displaced by a nitrogen gas. Then, 0.05 g of 2,2'-azobisisobutylonitrile (radical polymerization initiator) and 0.3 g of n-dodecyl mercaptan (polymerization conditioner) are added to the mixture in the reaction vessel with stirring. Then, the temperature inside the reaction vessel is raised to 80° C. under a nitrogen gas flow, and the resulting mixture is let undergo polymerization at 80° C.

When the reaction ratio has reached about 20%, that is, when an amount of a non-volatile portion has reached about 20 wt % on the basis of a total weight of the reaction mixture, the reaction vessel is cooled rapidly to room temperature to stop (suspend) the polymerization of the mixture, whereby polymer syrup is obtained. The resulting polymer syrup contains 20.8 wt % of the non-volatile portion. The non-volatile portion is synthetic resin mainly composed of poly(n-butyl methacrylate), having a number average molecular weight (Mn) of 32,000 and a weight average molecular weight (Mw) of 117,000 according to the gel permeation chromatography (GPC). In other words, the polymer syrup containing unreacted n-butyl methacrylate and poly(n-butyl methacrylate) as the synthetic resin (polyalkyl (meth)acryalte resin) is obtained as the result of the polymerization reaction.

Then, 34.1 g of n-butyl acrylate, 38.6 g of ethyl acrylate, 30.0 g of the above polymer syrup, and 2.8 g of trimethylol propane trimethacrylate are charged to a reaction vessel of the same type as the one used in Example 6. Then, 2.6 g of zinc oxide is added to the mixture in the reaction vessel and mixed with the same for 30 minutes with stirring.

Meanwhile, 2.2 g of acrylic acid, 2.7 g of methacrylic acid, and 0.53 g of water are mixed with one another, whereby a mixture liquid is prepared. A mole ratio of the metal compound (zinc oxide), carboxyl-group-containing vinyl monomer (a total of acrylic acid and methacrylic acid), and water is 1.0:2.08:1.0.

Then, the mixture liquid is added to the mixture in the reaction vessel with stirring, and the resulting mixture is let undergo reaction for one hour at 70° C. Then, it is confirmed that the entire amount of added zinc oxide is replaced with the zinc double salts by confirming that the resulting reaction mixture remains homogeneous and transparent in the same manner as Example 6. An amount of produced zinc double salts is 6.4 g. The monomer composition of the present invention, that is, the monomer composition added with synthetic resin, is obtained in this manner. The viscosity of the resulting monomer composition measured by a B-type viscometer is 40 centipoise at 25° C.

Then, 1 part of magnesium oxide as a thickener (adduct) is added to 100 parts of the above monomer composition, and mixed with the same for 30 minutes with stirring using a homomixer. The viscosity of the resulting monomer composition measured by the B-type viscometer is 75,000 centipoise at 25° C. Thus, it is revealed that the monomer composition added with the synthetic resin shows the thickening effect upon addition of the thickener. That is, it is discovered that when the viscosity is adjusted by exploiting the thickening effect, adequate viscosity can be conferred to the monomer composition. Accordingly, it is confirmed that the miscibility of the monomer composition and the adducts, such as the filler, reinforcement material, and coloring agent, and the dispersion stability of the adducts can be further improved. It is also confirmed that the handling and molding properties, and workability of the monomer composition can be further improved.

Then, 1.0 part of a curing agent (328E, organic peroxide of Kayaku Akzo Corporation) as the radical polymerization initiator and 0.4 part of a mineral spirit solution of cobalt octenate (containing 8 wt % of cobalt) are added to 100 parts of the thickened monomer composition and mixed with the same. Then, the elastomer of the present invention is obtained by carrying out the reaction and manipulation in the same manner as Example 6 using the resulting mixture. The resulting elastomer has a satisfactory outward appearance. The physical properties of the elastomer are measured in the above manners, and the results of which are set forth in Table 2 below.

TABLE 2

| EXAMPLE/ COMPARATIVE EXAMPLE | ALKYL (METH) ACRYLATE | POLYFUNCTIONAL VINYL MONOMER | METAL-SALT- CONTAINING VINYL MONOMER | DUROMETER HARDNESS (HDA) | TENSILE ELASTIC MODULUS (kgf/cm$^2$) | TENSILE BREAK STRENGTH (kgf/cm$^2$) |
|---|---|---|---|---|---|---|
| 6 | EA | TMPTMA | ZnD(M)A | 45 | 6.2 | 30.3 |
| 7 | EA | TMPTMA | ZnD(M)A | 60 | 15.5 | 48.7 |
| 8 | EA | DEGDMA | ZnD(M)A | 60 | 16.7 | 56.5 |
| 9 | EA | TMPTMA | MgD(M)A | 57 | 14.3 | 49.2 |
| 5 | EA | — | ZnD(M)A | 57 | 12.4 | 72.8 |
| 6 | EA | TMPTMA | — | 33 | 4.6 | 11.3 |
| 7 | EA | DEGDMA | — | 35 | 3.2 | 15.1 |
| 10 | BA/MMA | DEGDP-DMA | ZnDEMP | 50 | 5.7 | 48.3 |
| 8 | BA/MMA | — | ZnDEMP | 45 | 4.9 | 44.0 |
| 9 | BA/MMA | DEGDP-DMA | — | 30 | 3.7 | 13.9 |
| 11 | BA/EA/BMA | TMPTMA | ZnD(M)A | 45 | 10.0 | 55.3 |

TABLE 2-continued

| EXAMPLE/COMPARATIVE EXAMPLE | TENSILE BREAK ELONGATION (%) | TENSILE ELONGATION SET (%) | COMPRESSION SET (%) |
|---|---|---|---|
| 6 | 440 | 1.6 | 28.4 |
| 7 | 390 | 3.3 | 29.9 |
| 8 | 400 | 2.9 | 30.4 |
| 9 | 370 | 2.5 | 28.5 |
| 5 | 1500 | 16.3 | 101.0 |
| 6 | 280 | BROKEN | 8.6 |
| 7 | 410 | BROKEN | 7.0 |
| 10 | 970 | 2.1 | 26.8 |
| 8 | 1660 | 12.8 | 85.3 |
| 9 | 620 | BROKEN | 7.3 |
| 11 | 450 | 2.0 | 28.0 |

EA: ETHYL ACRYLATE TMPTMA: TRIMETHYLOL PROPANE TRIMETHACRYLATE ZnD(M)A: ZINC DOUBLE SALTS
DEGDMA: DIETHYLENE GLYCOL DIMETHACRYLATE MgD(M)A: MAGNESIUM DOUBLE SALTS BA: n-BUTYL ACRYLATE
MMA: METHYL METHACRYLATE DEGDP-DMA: DIMETHACRYALTE COMPOUND OF DIETHYLENE GLYCOL DIPHTHALATE
ZnDEMP: ZINC SALTS OF 2-METHACRYLOYL OXYETHYL PHTHALIC ACID BMA: n-BUTYL METHACRYLATE

It is obvious from the results of Examples 6–11 that each elastomer obtained by the producing process of the present invention has small creep (low creep) in compression set, tensile elongation set, etc., and excellent mechanical strength, such as tensile elastic modulus, tensile break strength, and tensile break elongation. In other words, the mechanical strength and the physical strength, such as creep, of each elastomer of the present invention are improved in a well balanced manner. In contrast, it is obvious from the results of Comparative Examples 5–9 that the balance of the mechanical strength and the physical properties, such as creep, of each comparative elastomer is not satisfactory.

(EXAMPLE 12)

Initially, (meth)acrylic syrup containing a polymer based on (meth)acrylate as the vinyl-group-containing polymer is synthesized. To be more specific, 177 parts of methyl methacrylate, 22.8 parts of methacrylic acid are charged to a reaction vessel of 500 ml equipped with a stirrer, a cooling pipe, a thermometer, and a gas conduit, after which air inside the reaction vessel is displaced by a nitrogen gas. Then, 0.1 part of 2,2'-azobisisobutylonitrile (radical polymerization initiator) and 0.28 part of n-dodecyl mercaptan (polymerization conditioner) are added to the mixture in the reaction vessel with stirring. Then, the temperature inside the reaction vessel is raised to 80° C. under a nitrogen gas flow, and the resulting mixture is let undergo polymerization at 80° C.

When the polymerization ratio has reached about 40%, that is, when an amount of a non-volatile portion (a copolymer of methyl methacrylate and methacrylic acid, namely, the polymer A) has reached about 40 wt %, 37.6 parts of glycidyl methacrylate, 0.15 part of benzyl triphenyl phosphonium chloride (catalyst), and 0.02 part of hydroquinone (polymerization inhibitor) are added to the reaction solution and mixed with the same, after which the reaction vessel is cooled abruptly.

After the reaction vessel is cooled abruptly, the temperature inside the reaction vessel is raised again to 100° C. with stirring under air atmosphere, and the resulting mixture is let undergo reaction for 23 hours at 100° C. In other words, vinyl groups are introduced to the side chains of the polymer A by reacting the polymer A with glycidyl methacrylate. Consequently, a mixture containing a copolymer of methyl methacrylate and methacrylic acid having at least two vinyl groups at the side chains, and unreacted methyl methacrylate and unreacted methacrylic acid, that is, methacrylic syrup containing the polymer based on methacrylate, (hereinafter, referred to as syrup A), is obtained.

The syrup A is transparent and contains 45.1 wt % of a non-volatile portion on the basis of a total weight of the syrup A. Also, the acid value of the polymer based on methacrylate contained in the syrup A is 21.0 mgKoH/g. Since the difference between the acid value of the polymer A and the acid value of the polymer based on methacrylate is 41.7 mgKOH/g, it is understood that 66.5% of carboxyl groups contained in the polymer A are replaced with the vinyl groups. The syrup A prepared in the above manner is used for the following reactions.

Here, 70.0 g of n-butyl acrylate as alkyl (meth)acrylate and 30.0 g of the syrup A as the vinyl-group-containing polymer are charged to a reaction vessel of 200 ml equipped with a stirrer, a cooling pipe, and a thermometer. Then, 1.3 g of zinc oxide as the metal compound is added to the mixture in the reaction vessel and mixed with the same with stirring for 30 minutes. Meanwhile, 1.1 g of acrylic acid and 1.35 g of methacrylic acid as the carboxyl-group-containing vinyl monomers, and 0.25 g of water are mixed with one another, whereby a mixture liquid is prepared. A mole ratio of the metal compound (zinc oxide), carboxyl-group-containing vinyl monomer (a total of acrylic acid and methacrylic acid), and water is 1.0:2.08:1.0.

Then, the mixture liquid is added to the mixture in the reaction vessel with stirring, and the resulting mixture is let undergo reaction for one hour at 70° C. The resulting reaction mixture (monomer mixture) is homogeneous and transparent and remains as such after it is cooled to room temperature. Further, the reaction mixture remains homogeneous and transparent after it is allowed to stand for one week at room temperature. Thus, it is confirmed that the entire amount of added zinc oxide is replaced with double salts of acrylic acid and methacrylic acid (zinc salts of acrylic acid and methacrylic acid, which are referred to as zinc double salts hereinafter). An amount of produced zinc double salts as the metal salt monomer is 3.2 g. The monomer composition of the present invention is obtained in this manner.

Then, 1.0 part of a curing agent (328E, an organic peroxide of Kayaku Akzo Corporation) as the radical polymerization initiator, and 0.4 part of a mineral spirit solution (containing 8 wt % of cobalt) of cobalt octenate are added to 100 parts of the above monomer composition and mixed with the same. The resulting mixture is filled in a cell composed of two glass plates and a gasket made of silicone resin, and let undergo polymerization for seven hours at 65° C., and for further two hours at 120° C., whereby the elastomer of the present invention is obtained.

The resulting elastomer has a transparent outward appearance. The physical properties of the elastomer are measured in the above manners. Then, the type A durometer hardness is 80HDA, tensile elastic modulus is 29.2 kgf/cm$^2$, tensile break strength is 64.6 kgf/cm$^2$, tensile break elongation is 270%, tensile elongation set is 3.0%, and compression set is 27.0%. The results of measurement are set forth in Table 3 below.

(EXAMPLE 13)

A reaction mixture is obtained by carrying out the reaction and manipulation in the same manner as Example 12 except that an amount of added zinc oxide, an amount of used acrylic acid, an amount of used methacrylic acid, and an amount of added water are increased to 2.6 g, 2.2 g, 2.7 g, and 0.53 g, respectively. Then, it is confirmed that the entire amount of added zinc oxide is replaced with the zinc double salts by confirming that the resulting reaction mixture remains homogeneous and transparent in the same manner as Example 12. An amount of produced zinc double salts is 6.4 g. The monomer composition of the present invention is obtained in this manner. The viscosity of the resulting monomer composition measured by the B-type viscometer is 85 centipoise at 25° C.

Then, the elastomer of the present invention is obtained by carrying out the reaction and manipulation in the same manner as Example 12 using the above monomer composition. The resulting elastomer has a transparent outward appearance. The physical properties of the elastomer are measured in the above manners, and the results of which are set forth in Table 3 below.

(EXAMPLE 14)

Here, 2 parts of a pigment dispersing agent (BYK D-101 of Big Chemical Company) is added to 100 parts of the monomer composition obtained in Example 13 and mixed with the same, after which 20 parts of carbon black (Sheathed N, LI-HAF of Tokai Carbon Co. Ltd) as the filler is added to the resulting mixture and mixed with the same for 30 minutes with stirring using a homomixer. Although the resulting dispersion liquid thickens and has thixotropy, it shows fluidity and maintains a stable dispersion state.

Then, the elastomer of the present invention is obtained by carrying out the reaction and manipulation in the same manner as Example 12 using the above dispersion liquid. The resulting elastomer has a transparent outward appearance. The physical properties of the elastomer are measured in the above manners, and the results of which are set forth in Table 3 below.

(EXAMPLE 15)

Here, 1 part of zinc oxide (Zinc Flower No. 1 of Sakai Kagaku Kogyo Kabushiki Kaisha) as the thickener (adduct) is added to 100 parts of the monomer composition obtained in Example 13 and mixed with the same with stirring for 30 minutes using a homomixer. Although the resulting dispersion liquid thickens, it shows fluidity and maintains a stable dispersion state. The viscosity of the dispersion liquid measured by the B-type viscometer is 83,000 centipoise at 25° C.

Then, the elastomer of the present invention is obtained by carrying out the reaction and manipulation in the same manner as Example 12 using the above dispersion liquid. The resulting elastomer has a transparent outward appearance. The physical properties of the elastomer are measured in the above manners, and the results of which are set forth in Table 3 below.

(EXAMPLE 16)

Here, 68.2 g of n-butyl acrylate and 14.3 g of methyl methacrylate as alkyl (meth)acrylate, 15.0 g of the syrup A obtained in Example 12, and 2.2 g of 2-methacryloyl oxyethyl phthalic acid (NK ester CB-1 of Shin Nakamura Kagaku Kabushiki Kaisha) as the carboxyl-group-containing vinyl monomer are charged to a reaction vessel of 200 ml equipped with a stirrer, a cooling pipe, and a thermometer, so as to be dissolved into one another. Then, 0.3 g of zinc oxide and 0.03 g of water are added to the mixture in the reaction vessel with stirring, and the resulting mixture is let undergo reaction for one hour at 70° C. A mole ratio of the metal compound (zinc oxide), carboxyl-group-containing vinyl monomer (2-methacryloyl oxyethyl phthalic acid), and water is 1.0:2.05:0.5.

The resulting reaction mixture (monomer mixture) is homogeneous and transparent, and remains as such after it is cooled to room temperature. Further, the reaction mixture remains homogeneous and transparent after it is allowed to stand for one week at room temperature. Thus, it is confirmed that the entire amount of added zinc oxide is replaced with zinc salts of 2-methacryloyl oxyethyl phthalic acid. An amount of produced zinc salts as the metal salt monomer is 2.5 g. The monomer composition of the present invention is obtained in this manner.

Then, 0.5 part of a 55 wt % dimethylphthalate solution of methyl ethyl ketone peroxide as the radical polymerization initiator and 0.5 part of a mineral spirit solution (containing 8 wt % of cobalt) of cobalt octenate are added to 100 parts of the above monomer composition and mixed with the same. The elastomer of the present invention is obtained by carrying out the reaction and manipulation in the same manner as Example 12. The resulting elastomer has a satisfactory outward appearance. The physical properties of the elastomer are measured in the above manners, and the results of which are set forth in Table 3 below.

(Comparative Example 10)

A comparative reaction mixture is obtained by carrying out the reaction and manipulation in the same manner as Example 13 except that 30.0 g of methyl methacrylate is used instead of the syrup A as the vinyl-group-containing polymer. Then, it is confirmed that the entire amount of added zinc oxide is replaced with the zinc double salts by confirming that the resulting reaction mixture remains homogeneous and transparent in the same manner as Example 12. An amount of produced zinc double salts is 6.4 g. A comparative monomer composition is obtained in this manner. In other words, a comparative monomer containing no vinyl-group-containing polymer is obtained.

Then, comparative elastomer is obtained by carrying out the reaction and manipulation in the same manner as Example 12 using the above comparative monomer composition. The resulting comparative elastomer has a transparent outward appearance. The physical properties of the elastomer are measured in the above manners. Then, it is revealed that the comparative elastomer has excellent tensile break strength and tensile break elongation, but poor tensile elongation set and compression set, that is, the comparative elastomer has large creep and poor rubber elasticity. The results of measurement are set forth in Table 3 below.

(Comparative Example 11)

Here, 70.0 g of n-butyl acrylate is mixed with 30.0 g of the syrup A obtained in Example 12, whereby a comparative monomer composition is prepared. In other words, a comparative monomer composition containing no metal salt monomer is obtained.

Then, 1.0 part of a curing agent (328E, an organic peroxide of Kayaku Akzo Corporation), and 0.4 part of a mineral spirit solution (containing 8 wt % of cobalt) of cobalt octenate are added to 100 parts of the above comparative monomer composition and mixed with the same. Then, the resulting mixture is filled in a cell of the same type as the one used in Example 12, and let undergo polymerization for 24 hours at room temperature, and for further two hours at 120° C., whereby comparative elastomer is obtained.

The resulting comparative elastomer has a transparent outward appearance. The physical properties of the elastomer are measured in the above manners. Then, it is revealed that the comparative elastomer has excellent tensile elongation set and compression set, but poor tensile break strength. The results of the measurement are set forth in Table 3 below.

(Comparative Example 12)

A comparative reaction mixture is obtained by carrying out the reaction and manipulation in the same manner as Example 16 except that an amount of used n-butyl acrylate and an amount of used methyl methacrylate are respectively increased to 70.0 g and 30.0 g, while the syrup A as the vinyl-group-containing polymer is not used. Then, it is confirmed that the entire amount of added zinc oxide is replaced with the zinc salts of 2-methacryloyl oxyethyl phthalic acid by confirming that the resulting reaction mixture remains homogeneous and transparent in the same manner as Example 16. An amount of produced zinc double salts is 2.5 g. A comparative monomer composition is obtained in this manner. In other words, a comparative monomer composition having no vinyl-group-containing polymer is obtained.

Then, comparative elastomer is obtained by carrying out the reaction and manipulation in the same manner as Example 16 using the above comparative monomer composition. The resulting comparative elastomer has a transparent outward appearance. The physical properties of the elastomer are measured in the above manners. Then, it is revealed that the comparative elastomer has excellent tensile break elongation, but poor tensile elongation set and compression set, that is, the comparative elastomer has large creep and poor rubber elasticity. The results of measurement are set forth in Table 3 below.

(Comparative Example 13)

Here, 68.2 g of n-butyl acrylate, 14.3 g of methyl methacrylate, and the 15.0 g of the syrup A obtained in Example 12 are mixed with one another, whereby a comparative monomer composition is prepared. In other words, a comparative monomer containing no metal salt monomer is obtained.

Then, comparative elastomer is obtained by carrying out the reaction and manipulation in the same manner as Example 16 using the above comparative monomer composition. The resulting comparative elastomer has a transparent outward appearance. The physical properties of the elastomer are measured in the above manners. Then, it is revealed that the comparative elastomer has excellent tensile elongation set and compression set, but poor tensile break strength. The results of measurement are set forth in Table 3 below.

TABLE 3

| EXAMPLE/ COMPARATIVE EXAMPLE | ALKYL (METH) ACRYLATE | VINYL-GROUP CONTAINING POLYMER | METAL-SALT-CONTAINING VINYL MONOMER | FILLER | DURDMETER HARDNESS (HDA) | TENSILE ELASTIC MODULUS (kgf/cm$^2$) | TENSILE BREAK STRENGTH (kgf/cm$^2$) |
|---|---|---|---|---|---|---|---|
| 12 | BA/MMA | SYRUP A | ZnD(M)A | — | 80 | 29.2 | 64.6 |
| 13 | BA/MMA | SYRUP A | ZnD(M)A | — | 90 | 65.1 | 103 |
| 14 | BA/MMA | SYRUP A | ZnD(M)A | CARBON BLACK | 90 | 89.1 | 86.2 |
| 15 | BA/MMA | SYRUP A | ZnD(M)A | ZINC OXIDE | 90 | 67.5 | 105 |
| 16 | BA/MMA | SYRUP A | ZnDEMP | — | 50 | 7.4 | 40.8 |
| 10 | BA/MMA | — | ZnD(M)A | — | 57 | 12.4 | 72.8 |
| 11 | BA/MMA | SYRUP A | — | — | 58 | 11.2 | 17.5 |
| 12 | BA/MMA | — | ZnDEMP | — | 45 | 4.9 | 44.0 |
| 13 | BA/MMA | SYRUP A | — | — | 50 | 8.9 | 20.1 |

| EXAMPLE/ COMPARATIVE EXAMPLE | TENSILE BREAK ELONGATION (%) | TENSILE ELONGATION SET (%) | COMPRESSION SET (%) |
|---|---|---|---|
| 12 | 270 | 3.0 | 27.0 |
| 13 | 220 | 3.5 | 31.5 |
| 14 | 100 | 3.7 | 33.3 |
| 15 | 200 | 3.6 | 32.7 |
| 16 | 500 | 2.8 | 25.4 |
| 10 | 1500 | 16.3 | 101.0 |
| 11 | 270 | BROKEN | 8.5 |
| 12 | 1660 | 12.8 | 65.3 |
| 13 | 250 | BROKEN | 7.6 |

BA: n-BUTYL ACRYLATE MMA: METHYL METHACRYLATE ZnD(M)A: ZINC DOUBLE SALTS
ZnDEMP: ZINC SALTS OF 2-METHACRYLOYL OXYETHYL PHTHALIC ACID

(EXAMPLE 17)

Initially, (meth)acrylic syrup containing a polymer based on (meth)acrylate as the vinyl-group-containing polymer is synthesized. To be more specific, 267 parts of n-butyl methacrylate, 12.0 parts of methacrylic acid are charged to a reaction vessel of 500 ml equipped with a stirrer, a cooling pipe, a thermometer, and a gas conduit, after which air inside the reaction vessel is displaced by a nitrogen gas. Then, 0.1 part of 2,2'-azobisisobutylonitrile and 0.28 part of n-dodecyl mercaptan are added to the mixture in the reaction vessel with stirring. Then, the temperature inside the reaction vessel is raised to 80° C. under a nitrogen gas flow, and the resulting mixture is let undergo polymerization at 80° C.

When the polymerization ratio has reached about 37%, that is, when an amount of a non-volatile portion (a copolymer of n-butyl methacrylate and methacrylic acid, namely the polymer A) has reached about 37 wt %, 20.0 parts of glycidyl methacrylate, 0.15 part of benzyl triphenyl phosphonium chloride, and 0.02 part of hydroquinone are added to the reaction solution and mixed with the same, and the reaction vessel is cooled abruptly.

After the reaction vessel is cooled abruptly, the temperature inside the reaction vessel is raised again to 100° C. with stirring under air atmosphere, and the resulting mixture is let undergo reaction for 23 hours at 100° C. In other words, vinyl groups are introduced to the side chains of the polymer A by reacting the polymer A with glycidyl methacrylate. Consequently, a mixture containing a copolymer of n-butyl methacrylate and methacrylic acid having at least two vinyl groups at the side chains, unreacted n-butyl methacrylate, and unreacted methacrylic acid, that is, methacrylic syrup containing the polymer based on methacrylate, (hereinafter, referred to as syrup B), is obtained.

The syrup B is transparent and has 41.8 wt % of the non-volatile portion on the basis of a total weight of the syrup B. Also, the acid value of the polymer based on methacrylate in the syrup B is 13.5 mgKOH/g. Since the difference between the acid value of the polymer A and the acid value of the polymer based on methacrylate is 16.6 mgKOH/g, it is understood that 55.1% of carboxyl groups contained in the polymer A are replaced with the vinyl groups. The syrup B prepared in the above manner is used for the following reactions.

Here, 31.4 g of n-butyl acrylate and 38.6 g of ethyl acrylate as alkyl (meth)acrylate and 30.0 g of the syrup B as the vinyl-group-containing polymer are charged to a reaction vessel of 200 ml equipped with a stirrer, a cooling pipe, and a thermometer. Then, 2.6 g of zinc oxide is added to the mixture in the reaction vessel and mixed with the same with stirring for 30 minutes. Meanwhile, 2.2 g of acrylic acid, 2.7 g of methacrylic acid, and 0.53 g of water are mixed with one another, whereby a mixture liquid is prepared. A mole ratio of the metal compound (zinc oxide), carboxyl-group-containing vinyl monomer (a total of acrylic acid and methacrylic acid), and water is 1.0:2.08:1.0.

Then, the mixture liquid is added to the mixture in the reaction vessel with stirring, and the resulting mixture is let undergo reaction for one hour at 70° C. Then, it is confirmed that the entire amount of added zinc oxide is replaced with the zinc double salts by confirming that the resulting reaction mixture remains homogeneous and transparent in the same manner as Example 12. An amount of produced zinc double salts as the metal salt monomer is 6.4 g. The monomer composition of the present invention is obtained in this manner.

Then, the elastomer of the present invention is obtained by carrying out the reaction and manipulation in the same manner as Example 12 using the above monomer composition. The resulting elastomer has a transparent outward appearance. The physical properties of the elastomer are measured in the above manners, and the results of which are set forth in Table 4 below.

(Comparative Example 14)

A comparative reaction mixture is obtained by carrying out the reaction and manipulation in the same manner as Example 17 except that 30.0 g of n-butyl methacrylate is used instead of the syrup B as the vinyl-group-containing polymer. Then, it is confirmed that the entire amount of added zinc oxide is replaced with the zinc double salts by confirming that the resulting reaction mixture remains homogeneous and transparent in the same manner as Example 12. An amount of produced zinc double salts is 6.4 g. A comparative monomer composition of the present invention is obtained in this manner. In other words, a comparative monomer composition containing no vinyl-group-containing polymer is obtained.

Then, comparative elastomer is obtained by carrying out the reaction and manipulation in the same manner as Example 12 using the above comparative monomer composition. The resulting comparative elastomer has a transparent outward appearance. The physical properties of the elastomer are measured in the above manners. Then, it is revealed that the comparative elastomer has excellent tensile break strength and tensile break elongation, but poor tensile elongation set and compression set, that is, the comparative elastomer has large creep and poor rubber elasticity. The results of measurement are set forth in Table 4 below.

(Comparative Example 15)

Here, 31.4 g of n-butyl acrylate, 38.6 g of ethyl acrylate, and 30.0 g of the syrup B obtained in Example 17 are mixed with one another, whereby a comparative monomer composition is prepared. In other words, a comparative monomer composition containing no metal salt monomer is obtained.

Then, comparative elastomer is obtained by carrying out the reaction and manipulation in the same manner as Example 12 using the above comparative monomer composition. The resulting comparative elastomer has a transparent outward appearance. The physical properties of the elastomer are measured in the above manners. Then, it is revealed that the comparative elastomer has excellent tensile elongation set and compression set, but poor tensile break strength. The results of measurement are set forth in Table 4 below.

(EXAMPLE 18)

Here, 31.4 g of n-butyl acrylate, 38.6 g of ethyl acrylate, 30.0 g of the syrup B obtained in Example 17, and 3.0 g of trimethylol propane trimethacrylate as the polyfunctional vinyl monomer are charged to a reaction vessel of 200 ml equipped with a stirrer, a cooling pipe, and a thermometer. Then, 2.6 g of zinc oxide is added to the mixture in the reaction vessel and mixed with the same for 30 minutes with stirring. Meanwhile, 2.2 g of acrylic acid, 2.7 g of methacrylic acid, and 0.53 g of water are mixed with one another, whereby a mixture liquid is prepared. A mole ratio of the metal compound (zinc oxide), carboxyl-group-containing vinyl monomer (a total of acrylic acid and methacrylic acid), and water is 1.0:2.08:1.0.

Then, the mixture liquid is added to the mixture in the reaction vessel with stirring, and the resulting mixture is let undergo reaction for one hour at 70° C. Then, it is confirmed that the entire amount of added zinc oxide is replaced with the zinc double salts by confirming that the resulting reaction mixture remains homogeneous and transparent in the same manner as Example 12. An amount of produced zinc double salts is 6.4 g. The monomer composition of the present invention is obtained in this manner.

Then, the elastomer of the present invention is obtained by carrying out the reaction and manipulation in the same manner as Example 12 using the above monomer composition. The resulting elastomer has a transparent outward appearance. The physical properties of the elastomer are measured in the above manners, and the results of which are set forth in Table 4 below.

(Comparative Example 16)

Here, 31.4 g of n-butyl acrylate, 38.6 g of ethyl acrylate, 30.0 g of the syrup B obtained in Example 17, and 3.0 g of trimethylol propane trimethacrylate are mixed with one another, whereby a comparative monomer composition is prepared. In other words, a comparative monomer composition containing no metal salt monomer is obtained.

Then, comparative elastomer is obtained by carrying out the reaction and manipulation in the same manner as Example 12 using the above comparative monomer composition. The resulting comparative elastomer has a transparent outward appearance. The physical properties of the elastomer are measured in the above manners. Then, it is revealed that the comparative elastomer has excellent tensile elongation set and compression set, but poor tensile break strength. The results of measurement are set forth in Table 4 below.

strength and physical properties, such as creep, of each comparative elastomer is not satisfactory.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process of production of crosslinked elastomer, comprising polymerizing a blended composition comprising a monomer composition and microscopic particles, wherein the monomer composition contains a compound having a plurality of polymeric groups and is mainly composed of ethyl acrylate and/or n-butyl acrylate, and the average primary particle size of the microscopic particles is in a range between 1 nm and 200 nm, to obtain a crosslinked elastomer having a tensile break elongation of 100% to 970%.

2. The process of production of crosslinked elastomer of claim 1, wherein said alkyl (meth)acrylate contains ethyl acrylate and/or n-butyl acrylate, and alkyl methacrylate.

3. The process of production of crosslinked elastomer of claim 1, wherein said compound having a plurality of polymeric groups within a molecule is a polymer having a plurality of vinyl groups within a molecule and/or a polyvalent metal salt vinyl compound.

4. The process of production of crosslinked elastomer of claim 1, wherein the average primary particle size of said microscopic particles is in a range between 10 nm and 100 nm.

5. The process of production of crosslinked elastomer of claim 1, wherein said microscopic particles are carbon black, and/or carbon black treated with a polymer.

TABLE 4

| EXAMPLE/ COMPARATIVE EXAMPLE | ALKYL (METH) ACRYLATE | VINYL-GROUP CONTAINING POLYMER | POLY-FUNCTIONAL VINYL MONOMER | METAL-SALT CONTAINING VINYL MONOMER | DUROMETER HARDNESS (HDA) | TENSILE ELASTIC MODULUS (kgf/cm$^2$) | TENSILE BREAK STRENGTH (kgf/cm$^2$) |
|---|---|---|---|---|---|---|---|
| 17 | BA/EA/BMA | SYRUP B | — | ZnD(M)A | 65 | 18.2 | 52.8 |
| 14 | BA/EA/BMA | — | — | ZnD(M)A | 50 | 10.4 | 62.4 |
| 15 | BA/EA/BMA | SYRUP B | — | — | 35 | 4.7 | 10.8 |
| 18 | BA/EA/BMA | SYRUP B | TMPTMA | ZnD(M)A | 68 | 20.0 | 60.1 |
| 16 | BA/EA/BMA | SYRUP B | TMPTMA | — | 50 | 6.5 | 7.0 |

| EXAMPLE/ COMPARATIVE EXAMPLE | TENSILE BREAK ELONGATION (%) | TENSILE ELONGATION SET (%) | COMPRESSION SET (%) |
|---|---|---|---|
| 17 | 340 | 2.8 | 20.7 |
| 14 | 1500 | 15.7 | 95.5 |
| 15 | 270 | BROKEN | BROKEN |
| 18 | 300 | 2.1 | 19.8 |
| 16 | 110 | BROKEN | BROKEN |

BA: n-BUTYL ACRYLATE EA: ETHYL ACRYLATE BMA: n-BUTYL METHACRYLATE
ZnD(M)A: ZINC DOUBLE SALTS TMPTMA: TRIMETHYLOL PROPANE TRIMETHACRYLATE

It is obvious from the results of Examples 12–18 that each elastomer obtained by the producing process of the present invention has small creep (low creep) in compression set, tensile elongation set, etc., and excellent mechanical strength, such as tensile elastic modulus, tensile break strength, and tensile break elongation. In other words, it is discovered that the mechanical strength and physical properties, such as creep, are improved in a well balanced manner. In contrast, it is obvious from the results of Comparative Examples 10–16 that the balance of the mechanical 6. The process of production of crosslinked elastomer of claim 1, wherein said microscopic particles are hydrous silicic acid and/or a metal salt of hydrous silicic acid.

7. The process of production of crosslinked elastomer of claim 1, wherein an amount of said microscopic particles blended to 100 parts by weight of said monomer composition is in a range between 5 parts by weight and 200 parts by weight.

8. The process of production of crosslinked elastomer of claim 1, wherein said microscopic particles blended to 100 parts by weight of said monomer composition is in a range between 10 parts by weight and 100 parts by weight.

9. The process of production of crosslinked elastomer of claim 1, wherein an amount of said microscopic particles blended to 100 parts by weight of said monomer composition is in a range between 10 parts by weight and 60 parts by weight.

10. The process of production of crosslinked elastomer of claim 1, wherein said blended composition contains synthetic resin which has been dissolved or dispersed in said monomer composition.

11. A process of production of crosslinked elastomer wherein:

a monomer mixture containing a metal salt of a monomer is obtained first by reacting a metal compound with a carboxyl-group-containing vinyl monomer in the presence of at least one kind of monomer selected from the group consisting of an alkyl (meth)acrylate mainly composed of ethyl acrylate and/or n-butyl acrylate, a polyfunctional compound, and a monofunctional vinyl monomer copolymerizable with said monomers;

then a monomer composition containing an alkyl (meth)acrylate which is mainly composed of ethyl acrylate and/or butyl acrylate, the polyfunctional compound, and metal salt of a monomer is obtained ultimately without separating the metal salt of a monomer from said monomer mixture; and said monomer composition is polymerized to obtain a crosslinked elastomer having a tensile break elongation of 100% to 970%.

12. The process of production of crosslinked elastomer of claim 11, wherein said metal compound is metal oxide and/or metal hydroxide.

13. The process of production of crosslinked elastomer of claim 11, wherein said metal compound is polyvalent metal oxide and/or polyvalent metal hydroxide.

14. The process of production of crosslinked elastomer of claim 11, wherein an equivalent ratio of said carboxyl-group-containing vinyl monomer and said metal compound is in a range between 1.0 and 1.2.

15. The process of production of crosslinked elastomer of claim 11, wherein said alkyl (meth)acrylate contains ethyl acrylate and/or n-butyl acrylate, and alkyl methacrylate.

16. The process of production of crosslinked elastomer of claim 11, wherein said polyfunctional compound is a polymer based on (meth)acrylate having at least two vinyl groups at a side chain and/or an end terminal.

17. The process of production of crosslinked elastomer of claim 11, wherein said carboxyl-group-containing vinyl monomer contains acrylic acid and methacrylic acid.

18. The process of production of crosslinked elastomer of claim 11, wherein said metal compound is reacted with said carboxyl-group-containing vinyl monomer in the presence of water.

19. The process of production of crosslinked elastomer of claim 11, wherein said metal compound is reacted with said carboxyl-group-containing vinyl monomer in the presence of a solubilizing agent.

20. The process of production of crosslinked elastomer of claim 11, wherein said metal compound is reacted with said carboxyl-group-containing vinyl monomer in the presence of water and a solubilizing agent.

21. The process of production of crosslinked elastomer of claim 11, wherein said monomer composition contains synthetic resin which has been dissolved or dispersed in said monomer composition.

22. The process of production of crosslinked elastomer of claim 11, wherein said monomer composition contains microscopic particles having an average primary particle size in a range between 1 nm and 200 nm.

23. Crosslinked elastomer produced by polymerizing a monomer composition containing 30 wt %–90 wt % of an alkyl (meth)acrylate which is mainly composed of ethyl acrylate and/or n-butyl acrylate, 0.5 wt %–10 wt % of a polyfunctional vinyl monomer, and 0.5 wt %–20 wt % of a metal salt of a monomer on the basis of total weight of said monomer composition, said crosslinked elastomer having a tensile break elongation of 100% to 970%.

24. The crosslinked elastomer of claim 23, wherein said alkyl (meth)acrylate contains ethyl acrylate and/or n-butyl acrylate, and alkyl methacrylate.

25. The crosslinked elastomer of claim 23, wherein said monomer composition contains synthetic resin which has been dissolved or dispersed in said monomer composition.

26. The crosslinked elastomer of claim 23, wherein said monomer composition contains microscopic particles having an average primary particle size in a range between 1 nm and 200 nm.

27. Crosslinked elastomer produced by polymerizing a composition containing 30 wt %–98.5 wt % of an alkyl (meth)acrylate which is mainly composed of ethyl acrylate and/or n-butyl acrylate, 1 wt %–50 wt % of a vinyl-group-containing vinyl polymer, and 0.5 wt %–20 wt % of a metal salt of a monomer on the basis of total weight of said monomer composition, said crosslinked elastomer having a tensile break elongation of 100% to 970%.

28. The crosslinked elastomer of claim 27, wherein said vinyl-group-containing polymer is a polymer based on (meth)acrylate having at least two vinyl groups at a side chain and/or an end terminal.

29. The crosslinked elastomer of claim 27, wherein said monomer composition further contains a polyfunctional vinyl monomer.

30. The crosslinked elastomer of claim 27, wherein said alkyl (meth)acrylate contains ethyl acrylate and/or n-butyl acrylate, and alkyl methacrylate.

31. The crosslinked elastomer of claim 27, wherein said monomer composition contains synthetic resin which has been dissolved or dispersed in said monomer composition.

32. The crosslinked elastomer of claim 27, wherein said monomer composition contains microscopic particles having an average primary particle size in a range between 1 nm and 200 nm.

* * * * *